Jan. 21, 1941.   C. B. STRAUCH   2,229,613
PROCESS OF AND APPARATUS FOR FORMING ARTICLES FROM PLASTIC SHEET MATERIAL
Filed Nov. 22, 1938   12 Sheets-Sheet 1

Witness:
A. A. Horn

Inventor:
Clauss B. Strauch
by Brown & Garham
Attorneys.

Jan. 21, 1941.    C. B. STRAUCH    2,229,613
PROCESS OF AND APPARATUS FOR FORMING ARTICLES FROM PLASTIC SHEET MATERIAL
Filed Nov. 22, 1938    12 Sheets-Sheet 2

Witness:
A. A. Horn

Inventor:
Clauss B. Strauch by Brown & Parham
Attorneys.

Jan. 21, 1941.   C. B. STRAUCH   2,229,613
PROCESS OF AND APPARATUS FOR FORMING ARTICLES FROM PLASTIC SHEET MATERIAL
Filed Nov. 22, 1938   12 Sheets-Sheet 3
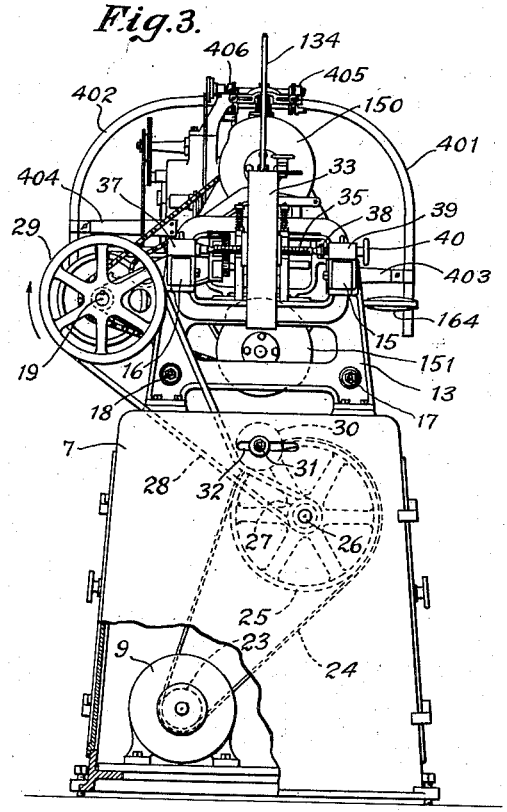
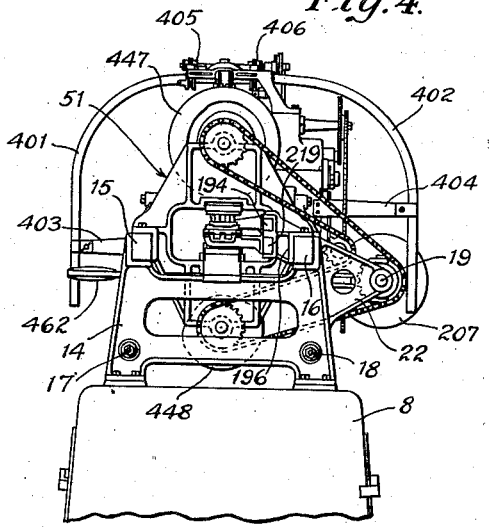
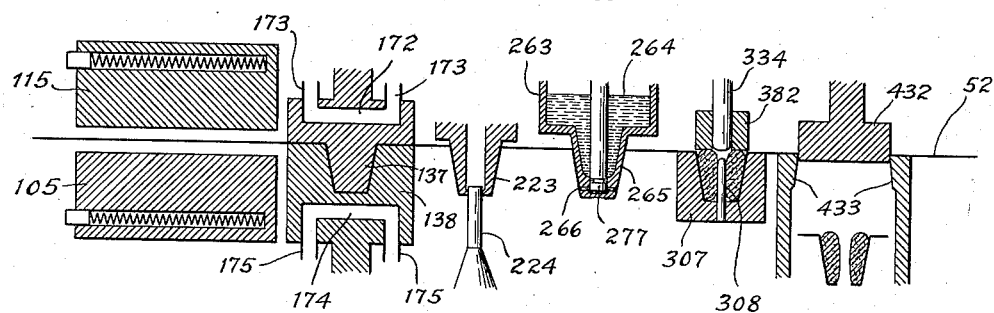
Witness:
A. A. Horn
Inventor:
Clauss B. Strauch
by Brown & Parham
Attorneys.

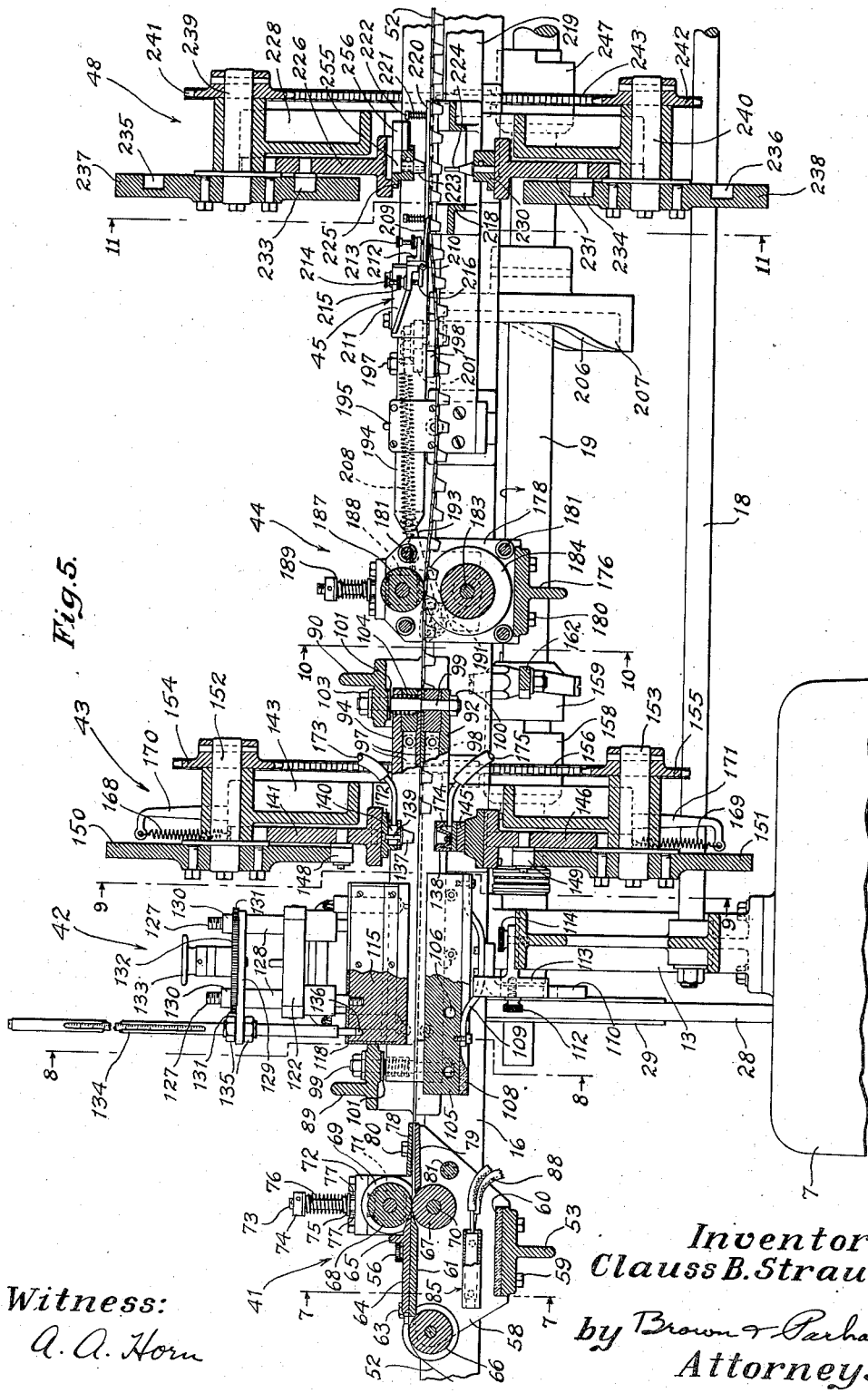

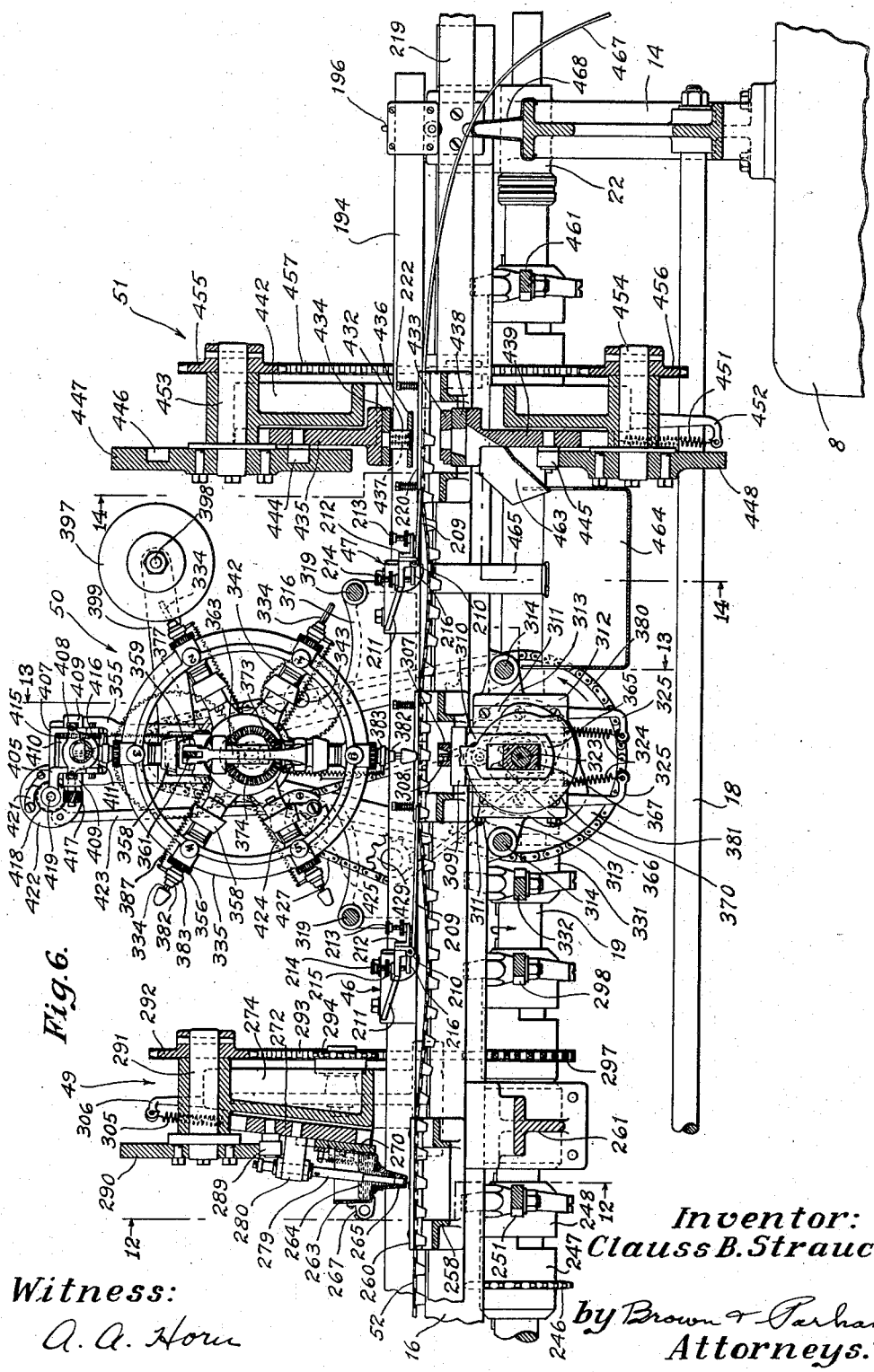

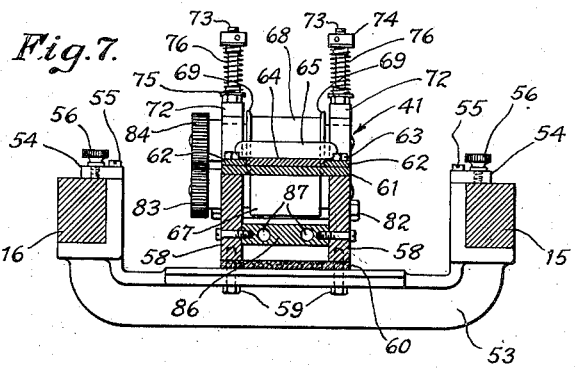

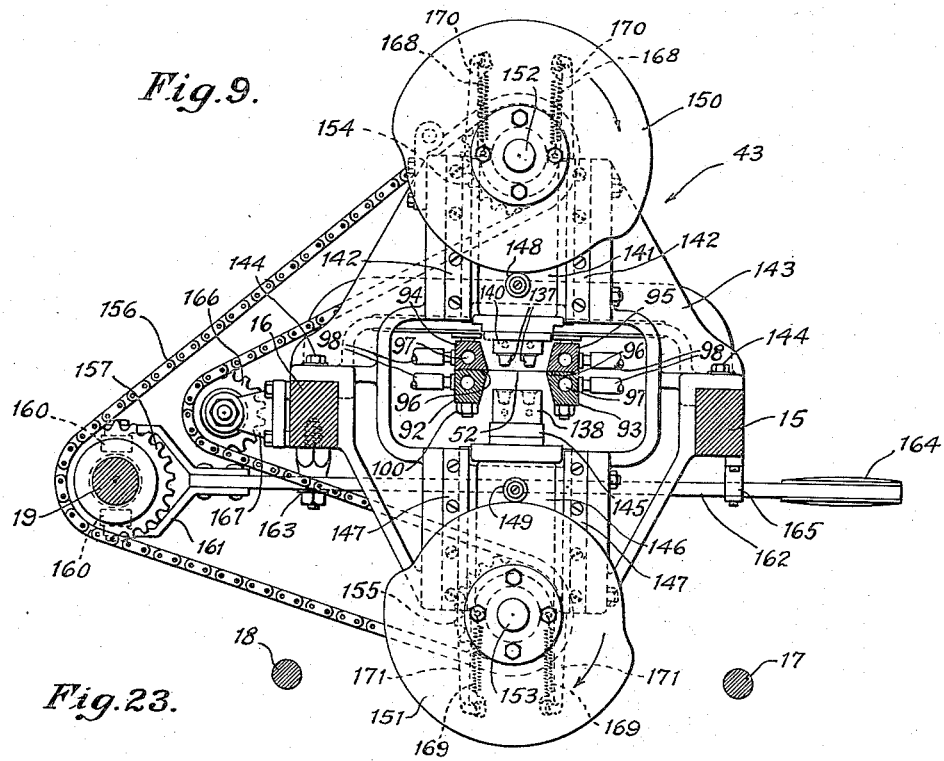
Fig.9.
Fig.23.
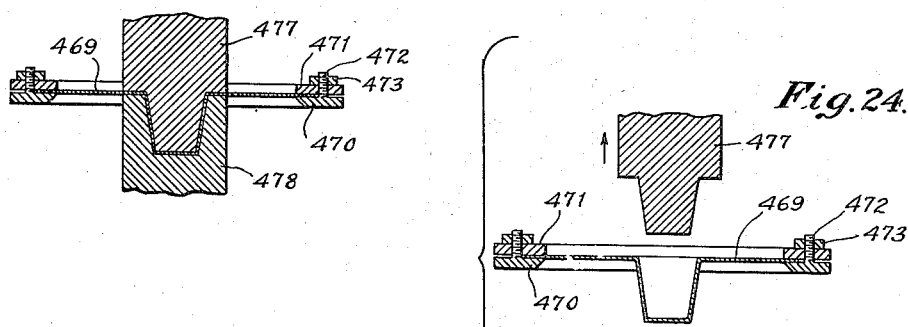
Fig.24.
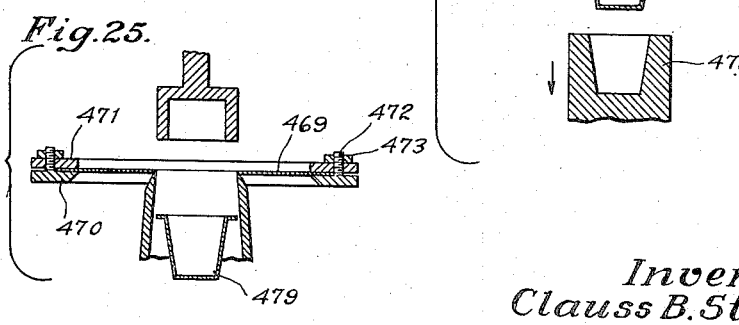
Fig.25.
Inventor:
Clauss B. Strauch
by Brown & Parham
Attorneys.

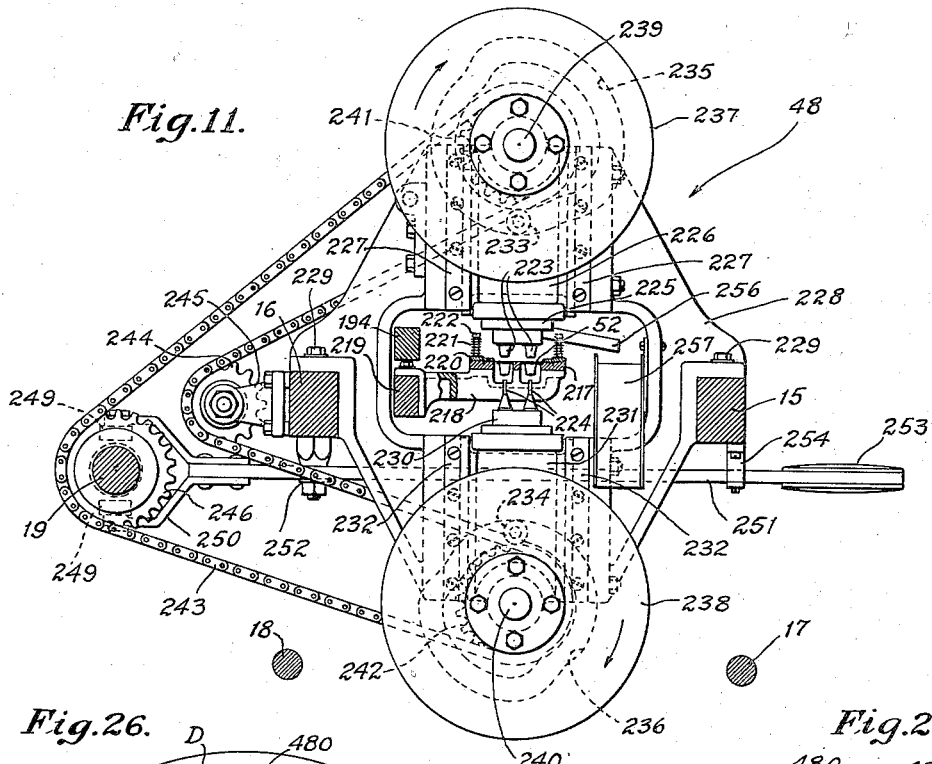
Fig.11.
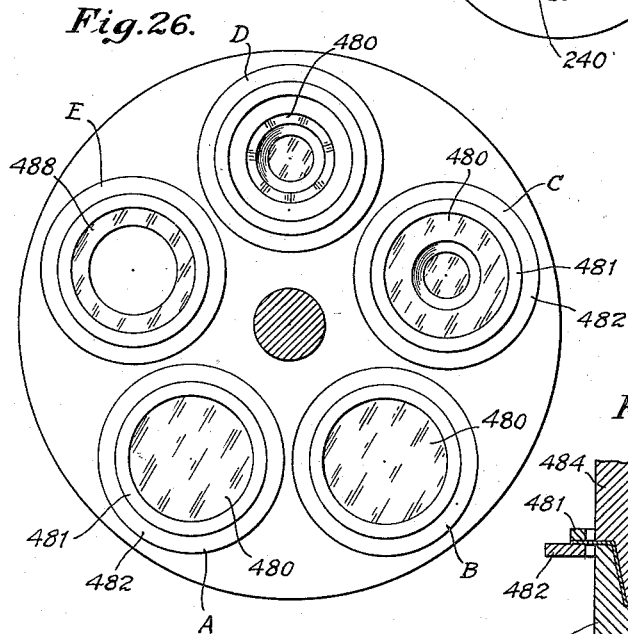
Fig.26.
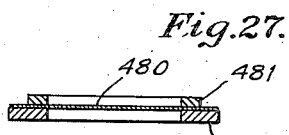
Fig.27.
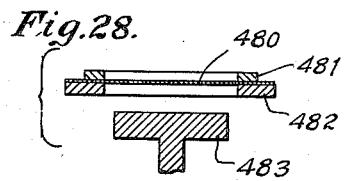
Fig.28.
Fig.29. Fig.30.
Fig.31.
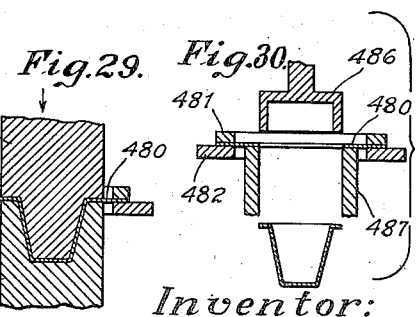
Inventor:
Clauss B. Strauch
by Brown & Parham
Attorneys.
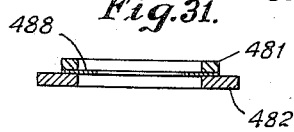

Jan. 21, 1941. C. B. STRAUCH 2,229,613
PROCESS OF AND APPARATUS FOR FORMING ARTICLES FROM PLASTIC SHEET MATERIAL
Filed Nov. 22, 1938 12 Sheets-Sheet 9
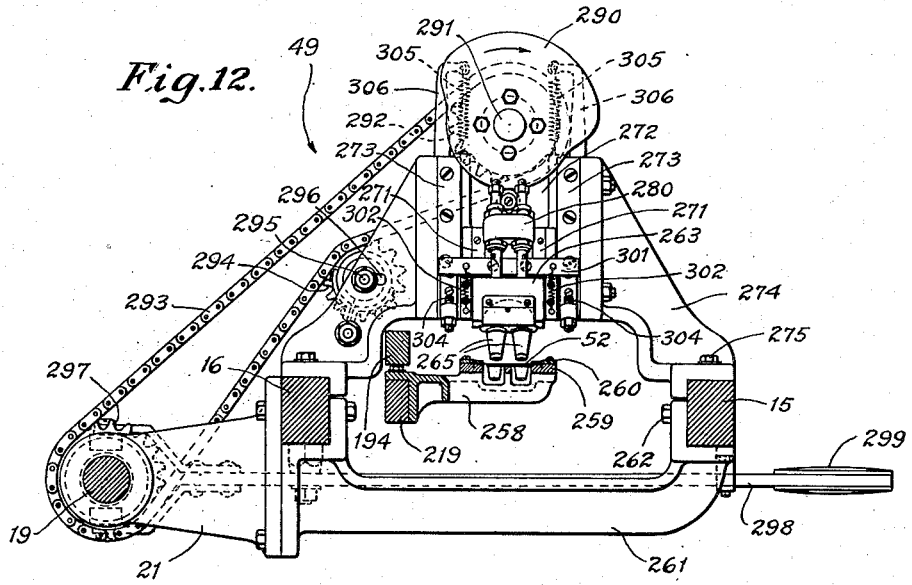
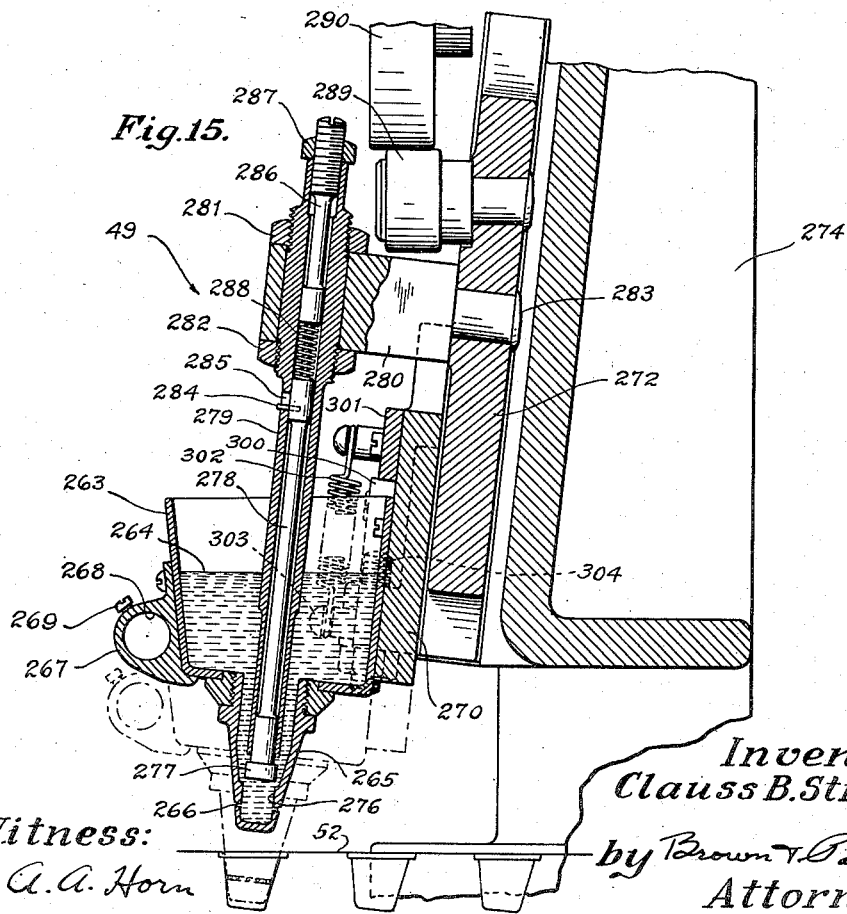
Inventor:
Clauss B. Strauch
by Brown & Parham
Attorneys.
Witness:
A. A. Horn Jan. 21, 1941.  C. B. STRAUCH  2,229,613
PROCESS OF AND APPARATUS FOR FORMING ARTICLES FROM PLASTIC SHEET MATERIAL
Filed Nov. 22, 1938  12 Sheets—Sheet 10
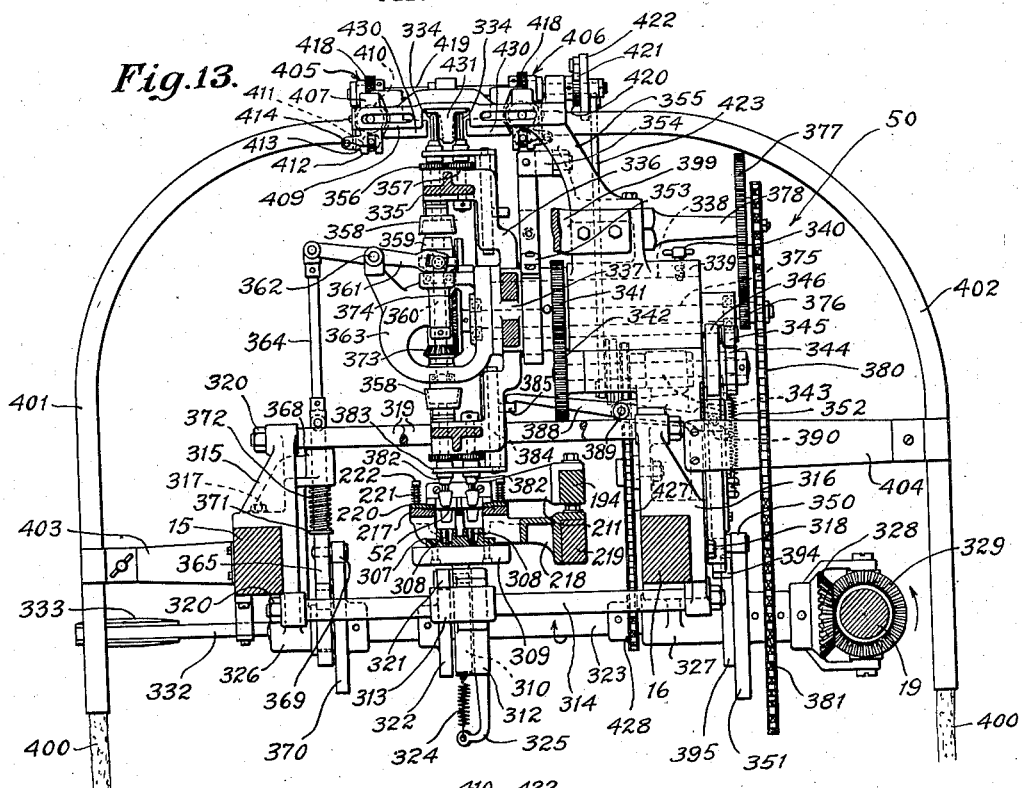
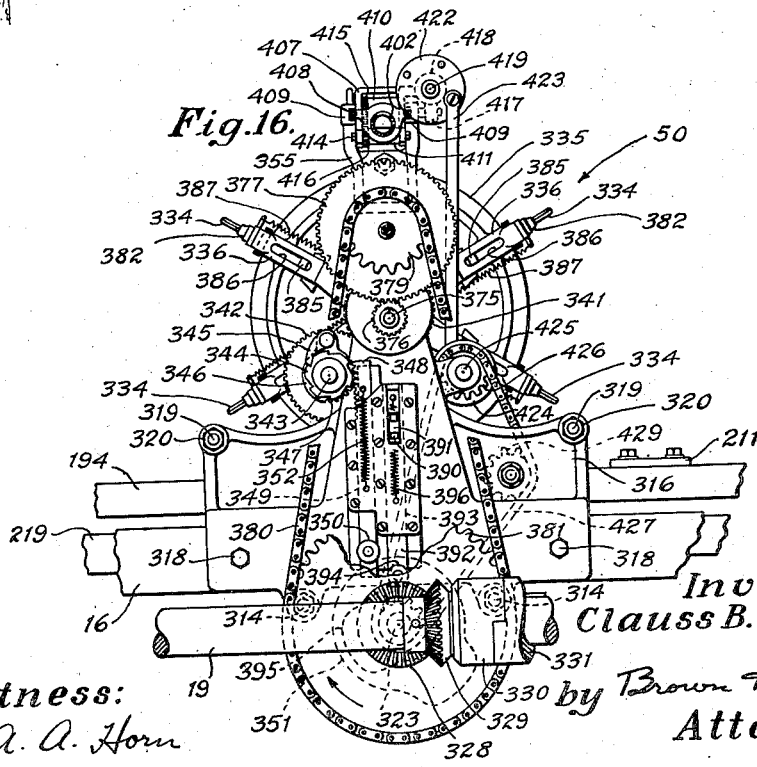
Witness:
A. A. Horn
Inventor:
Clauss B. Strauch
by Brown & Parham
Attorneys.

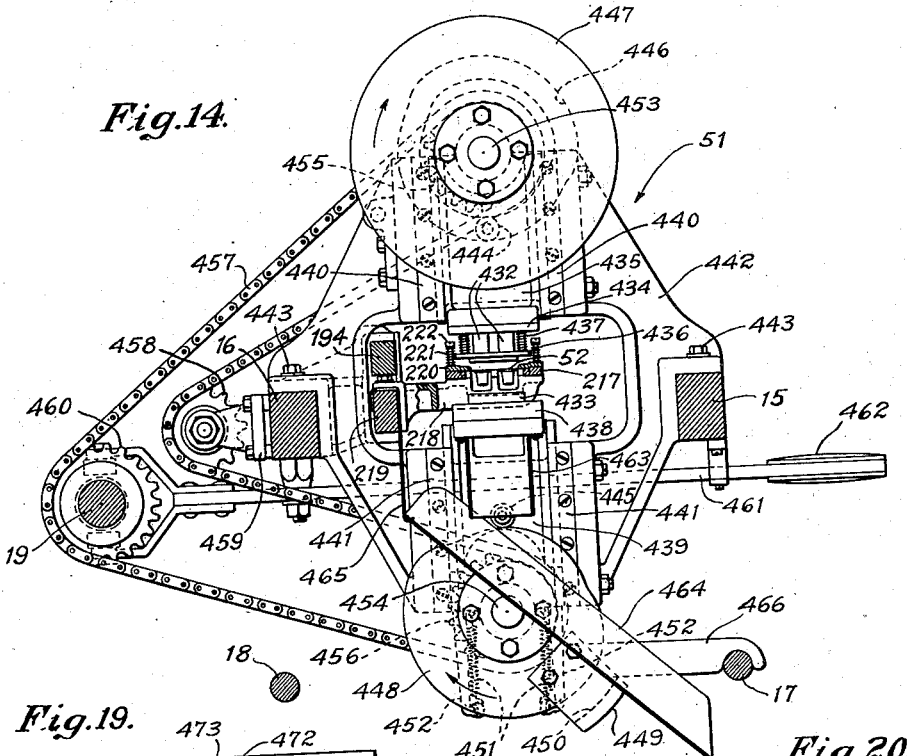
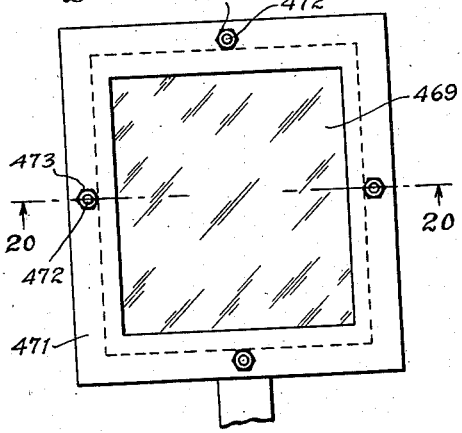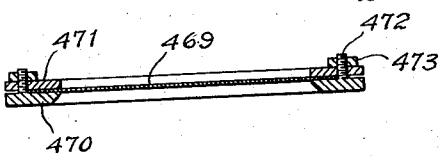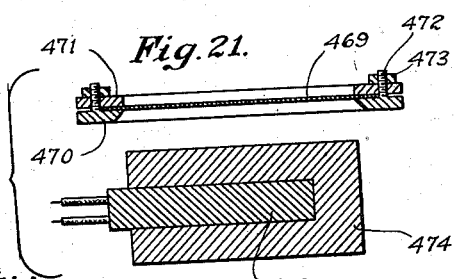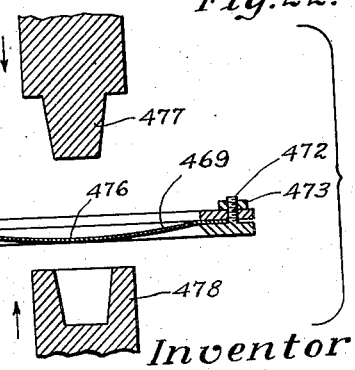

Inventor:
Clauss B. Strauch
by Brown & Parham
Attorneys.

Patented Jan. 21, 1941

2,229,613

UNITED STATES PATENT OFFICE 2,229,613

PROCESS OF AND APPARATUS FOR FORMING ARTICLES FROM PLASTIC SHEET MATERIAL

Clauss Burkart Strauch, Milwaukee, Wis., assignor, by mesne assignments, to Plax Corporation, Hartford, Conn., a corporation of Delaware Application November 22, 1938, Serial No. 241,722

37 Claims. (Cl. 18—19)

This application relates to a process of and apparatus for forming articles from plastic sheet material and more particularly to the forming of articles by die-pressing from relatively thin sheets of organic plastic material to form deeper draws in proportion to the thickness of the material than has heretofore been found possible or practicable. As such, the invention is a continuation in part of my copending applications, Serial Nos. 56,905 and 143,113, filed respectively December 31, 1935, and May 13, 1937, both of which applications are to be abandoned in favor of the present one.

Among the objects of the present invention are to provide a process and an apparatus for forming articles from sheet plastic material by heating a selected portion thereof, usually centrally of the sheet, sufficiently to render the material of this portion placctic and moldable, while preventing distortion of the heated portion of the sheet, which might otherwise occur, by holding certain at least of the perimetrically disposed unheated portions of the sheet against relative movement. The heated portion of the sheet is then formed to the shape of the desired article by the application of differential pressure to opposite sides thereof, usually by cooperating dies, which operation usually occurs at a point spaced from that at which the sheet is heated in order to utilize the necessary apparatus to the maximum extent.

A further object of this invention is to provide for the carrying on of the heating and forming steps of the process at different places, so that these operations may occur simultaneously or in some overlapping time relation, either on different sheets or on different parts of the same sheet or strip of plastic material.

A further object of the invention, when using dies as above set forth, is to provide for the rigidifying of the plastic material concomitantly with the shaping thereof by controlling the temperatures of the dies to a point such that this result will be effected. In the case of thermoplastic material, the dies are normally cooled, or in any event maintained at a temperature somewhat below the softening point of the material being worked. The temperature of the dies will, of course, depend upon the characteristics of the plastic material being worked and the speed of operation.

A further object of the invention is to provide for the forming of articles by a process and with apparatus as above set forth by which articles, such as filters, which may be used as nasal inhalers or otherwise, and which have shell portions formed of plastic material as aforesaid, are then perforated by suitable means and thereafter are filled with a suitable filtering material.

A further object of the invention is to provide for the forming of articles according to the process aforesaid, wherein the articles formed are maintained integral with the parent body or strip of the sheet from which they are formed until the formation and filling, if such be done, is completed; after which the article is cut or blanked out from the remainder of the sheet or strip.

A further object of the present invention is to carry on some or all of the processes referred to above, using a long strip of material, such as thermoplastic material, the several operations being performed preferably simultaneously or in some overlapping time relation on different portions of the strip and along the path of movement thereof.

A further object of the present invention is to provide for the holding of certain portions only of the perimetry of an area from which an article is to be formed, other portions between the held portions being free to move as by the forming of slits along the perimeter to permit the movement of the material in drawing away from the slitted portions during the forming thereof and so as to permit the inclusion of a larger percentage of the material of the original sheet in the completed article. In this connection the slits may be formed parallel to one another on oppostie sides of the area to be formed, at the corners thereof and extending part way along each side from such corners, or in other selected ways.

Another object of the invention is to provide for the forming of articles by deep drawing as aforesaid, by the use of dies wherein the female die is so arranged as to be closed in order that air be trapped between the female die and the sheet during the forming of an article in such die, so that this air, which escapes between the female die and the sheet during the forming of an article, will serve as a partial insulation to prevent too rapid cooling or temperature changes in the sheet, which would tend to rigidify it prior to the completion of the formation of the article.

A further object of the invention is to provide for the positive cooling of the portions of the sheet which are engaged by holding means to prevent their relative movement, while the central portion of the sheet is heated and/or is still soft, so as to retain the held portions of the sheet against softening from their normal rigid condition to provide adequate means for holding the sheet during the heating and forming thereof.

A further and more specific object of the invention is to provide, in the forming of articles from an elongate strip of material as aforesaid, for bending the lateral edge portions of the strip to form laterally disposed flanges, which may be passed through suitable guides for preventing relative movement of the lateral portions of the sheet during the heating of the central portion thereof, the guides themselves preferably being positively cooled.

A further object of the invention is to provide an apparatus for carrying out the several process steps aforesaid, which will be relatively simple in construction and automatic and free from trouble in operation, while being effective rapidly to form articles as aforesaid in a substantially continuous manner. The apparatus hereby provided preferably is such as will require little attention once it has been properly adjusted and started in its full automatic operation.

Further and more specific objects of the invention relate to the provision of an improved form of apparatus for carrying out the process steps as hereinabove mentioned, including the steps for forming flanges on the lateral edges of a continuous strip of plastic material, the provision of means for heating the central portions only of the strip while maintaining the edges cool so that they may be held against relative movement during the forming of articles with cooperative dies while concomitantly rigidifying the articles during the forming thereof; and, in the specific embodiment of the invention herein disclosed for making nasal inhalers, the invention provides means for perforating the bottoms of the shaped portions of the strip, means for supplying an adhesive to the interior of the shaped and perforated portions and thereafter for supplying a hollow shaped body of a fibrous material, such as absorbent cotton, to the interior of the shapes or depressions of the strip, while suitably centering this cotton roll filling therein. The invention also includes means for cutting out the formed articles, irrespective of their shape and subsequent use from the remainder of the strip.

Other and more detailed objects of the present invention will become apparent from the following specification and appended claims when taken in connection with the accompanying drawings, in which:

Fig. 3 is a view substantially in end elevation from the left-hand end of Fig. 1;

Fig. 4 is a fragmentary view substantially in end elevation from the right-hand end of Fig. 1;

Figure 17:
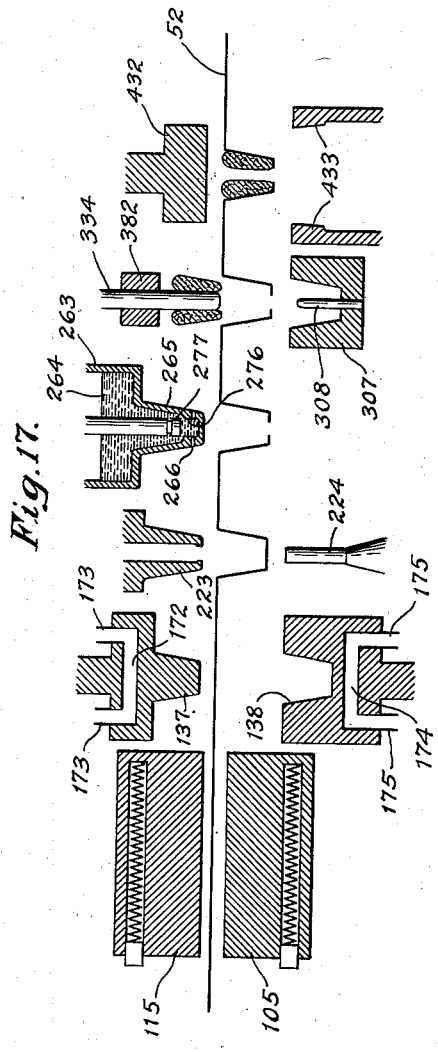
Figure 32:
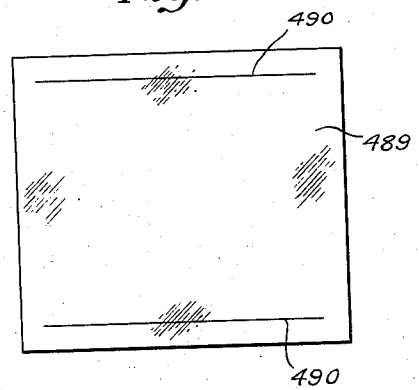
Figure 35:
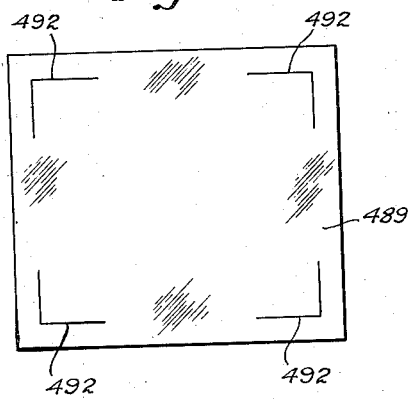
Figure 33:
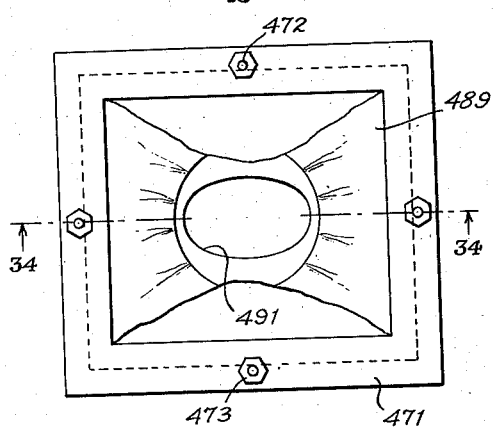
Figure 36:
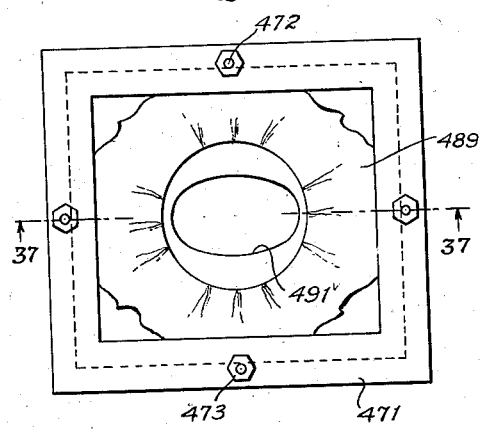
Figure 34:
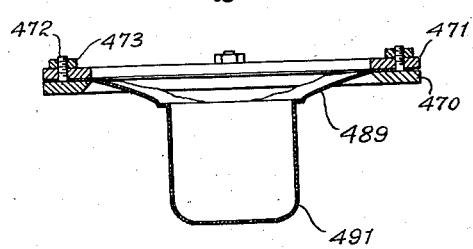
Figure 37:
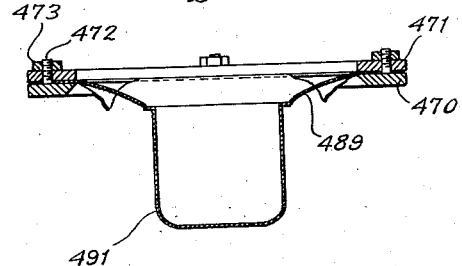

Figs. 5 and 6 when placed end to end form a view substantially in longitudinal vertical section of the machine of the previous figures;

Fig. 7 is a view substantially in vertical section on the line 7—7 of Fig. 5 illustrating the flanging unit;

Fig. 8 is a view substantially in vertical section on the line 8—8 of Fig. 5 illustrating the heating unit;

Fig. 9 is a view substantially in vertical section on the line 9—9 of Fig. 5, illustrating the shaping unit;

Fig. 10 is a view substantially in vertical section on the line 10—10 of Fig. 5 illustrating the material moving means;

Fig. 11 is a view substantially in vertical section on the line 11—11 of Fig. 5 illustrating the perforating unit;

Fig. 12 is a view substantially in vertical section on the line 12—12 of Fig. 6 illustrating the adhesive-applying unit;

Fig. 13 is a view substantially in vertical section on the line 13—13 of Fig. 6 illustrating the cotton unit;

Fig. 14 is a view substantially in vertical section on the line 14—14 of Fig. 6 illustrating the cutout unit;

Fig. 15 is a view substantially in vertical section on the same plane as that of Fig. 6, but on a larger scale and showing certain further parts in section, showing the internal construction of the adhesive applying unit;

Fig. 16 is a fragmentary view with certain of the parts shown in vertical section and other parts in elevation as seen from the right in Fig. 13 of the cotton unit, the view being taken from the rear of the machine;

Fig. 17 is a diagrammatic view substantially in vertical section illustrating the process applied to the production of nasal inhalers;

Fig. 18 is a view similar to Fig. 17 with the parts in different positions;

Fig. 19 is a plan view illustrating a frame holding a sheet of organic plastic material from which an article may be formed according to the invention;

Fig. 20 is a vertical section of the apparatus of Fig. 19 taken on the line 20—20 of that figure;

Fig. 21 is a diagrammatic view substantially in vertical section showing the frame and sheet of Figs. 19 and 20 held adjacent to a source of heat for heating a selected portion of the plastic sheet;

Fig. 22 is a view in vertical section of the sheet held in the frame of Figs. 19 to 21 and in position to be formed into an article, forming dies being shown in vertical section for forming the article;

Fig. 23 is a view, similar to Fig. 22, showing the dies in position in contact with the sheet for forming it;

Fig. 24 is a similar view showing the sheet formed and the dies separated therefrom;

Fig. 25 is a similar view showing the article formed by the process of Figs. 22 to 24 being blanked out of the sheet by a cutting means, the cutting means being shown in vertical section;

Fig. 26 is a view substantially in plan illustrating a rotary type machine by which the process illustrated in Figs. 19 to 25 inclusive may be performed;

Fig. 27 is a diagrammatic detail view in vertical section of one of the frames of the type illustrated in Fig. 26 with a sheet held therein;

Fig. 28 is a view similar to Fig. 27 illustrating the sheet held in the frame and supported over a heating means;

Fig. 29 is a similar view showing dies for forming an article from the sheet and the forming thereof;

Fig. 30 is a similar view illustrating the blanking or cutting out of a finished article from the sheet while it is still held in the frame;

Fig. 31 is a view similar to Fig. 27 of the frame and the remainder of the sheet after a finished article has been blanked or cut out therefrom;

Fig. 32 is a view in plan showing a sheet having spaced parallel slits therein from which an article may be formed by the process illustrated in Figs. 19 to 25;

Fig. 33 is a plan view showing a frame holding the sheet of Fig. 32 after an article has been formed therefrom;

Fig. 34 is a view substantially in vertical section on the line 34—34 of Fig. 33; and Figs. 35, 36 and 37 are a series of views corresponding respectively to Figs. 32, 33 and 34, wherein the sheet is slit at the corners and extending part way along each side.

While the process of the present invention may be carried out in the making of many different types of articles and in the filling of containers, and including semi-finished articles which must be subjected to further manufacturing operations before being in the final desired form, there is chosen for illustration in the present case an apparatus for the making of nasal inhalers from thermoplastic materials, such for example as cellulose acetate. This material as disclosed herein is supplied in strip form from .005" to .015" in thickness and is disclosed as being of such width that two similar articles are formed across the width of the strip or ribbon. It will be understood, however, that the same process and the same or similar apparatus may be used in the production of many other types and shapes of articles, and one or more of such articles may be formed across the width of the strip used, depending upon the size of the strip available and the size or dimensions of the articles to be formed.

A machine built in accordance with the present disclosure, and corresponding to that shown in Figs. 1 to 16 of the drawings of this application, has been built and successfully operated in the making of nasal inhalers at relatively high speeds and in a fully automatic manner.

THE MACHINE OF FIGS 1 to 16

General Construction

The machine shown in these figures comprises a pair of base boxes 7 and 8, the box 7 being used to contain the prime mover for the apparatus here shown as an electric motor 9 while the box 8 is hollow and may be used for storage of any desired equipment for use in conjunction with the apparatus. The boxes 7 and 8 are provided respectively with suitable brackets 10 and 11 connected by a transverse table 12, which may be of wood or any other desired material, the construction thus far described being used solely for providing a mounting and a driving means for the remainder of the apparatus.

Mounted on boxes 7 and 8 respectively are a pair of similar leg castings 13 and 14 connected together at their upper ends by longitudinally extending rails 15 and 16 and at their lower ends by a pair of spacer or tie rods 17 and 18. All the apparatus for performing the several operations is mounted on this frame structure, as hereinafter set forth.

Inasmuch as all the several units are driven in synchronism and from a common drive, the main drive shaft and the manner of rotation thereof will now be described. This drive shaft is shown in Fig. 2 at 19 and extends longitudinally of the machine at the rear thereof, being journaled in bearings formed in brackets 20, 21 and 22. The main drive shaft 19 may be driven by any suitable source of power, such for example as a prime mover here comprising the electric motor 9. The motor 9 is provided with the usual pulley 23, Fig. 1, arranged to drive a belt 24 passing around a larger pulley 25 on an intermediate shaft 26, which is journaled in suitable bearings formed in the box 7. This shaft 26 also carries a relatively small pulley 27, Figs. 1 and 3, driving a belt 28, which passes around a pulley 29 secured to the drive shaft 19. An intermediate idler 30 is provided on a stub shaft 31, which is adjustable along a slot 32 so as to effect a desired tightening of the belt 28. There is thus provided a direct drive from the motor 9 to the drive shaft 19 with a speed reduction interposed therein.

Figure 1:
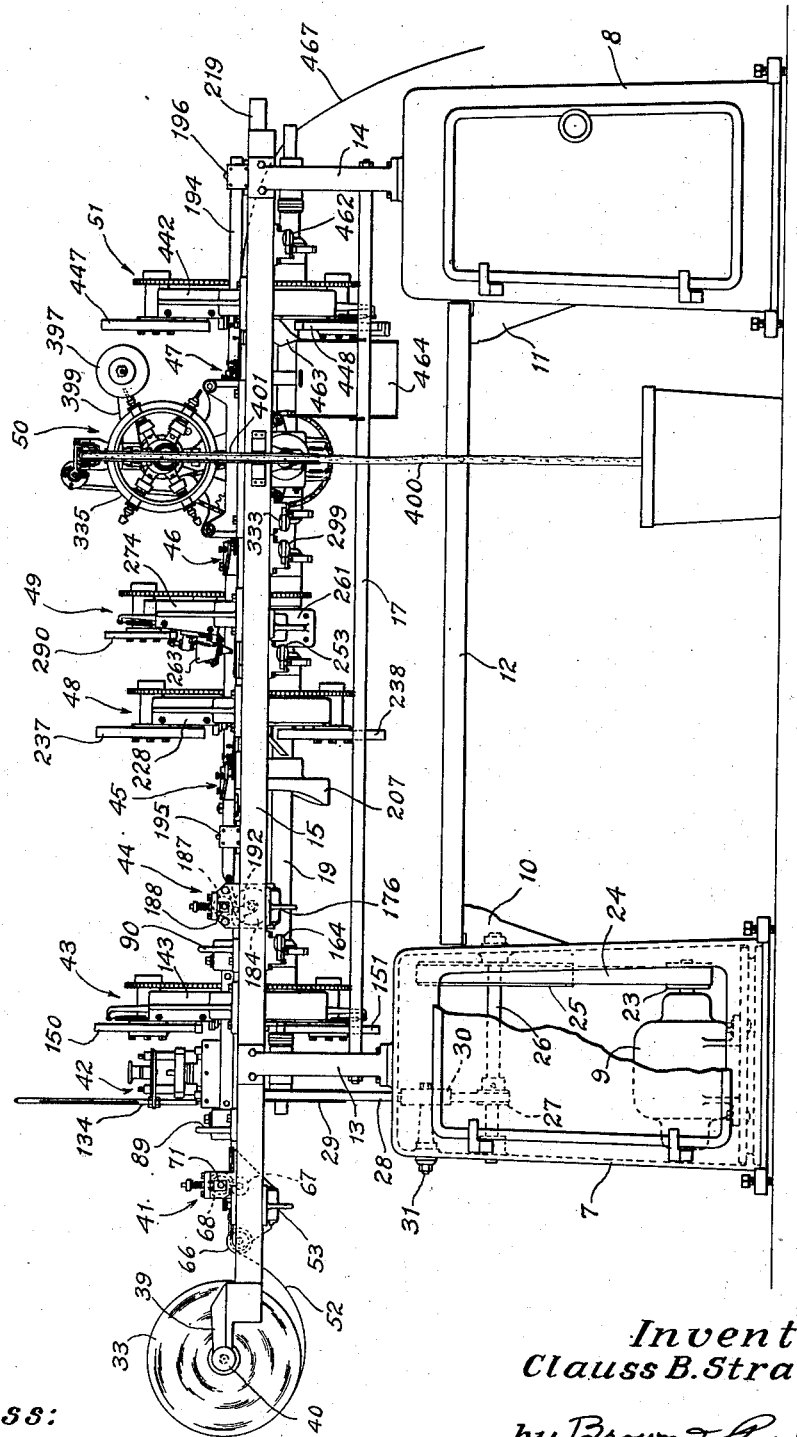
Figure 1 is a view in elevation showing substantially the entire machine for making nasal inhalers from thermoplastic material and filling them with cotton.
Figure 2:
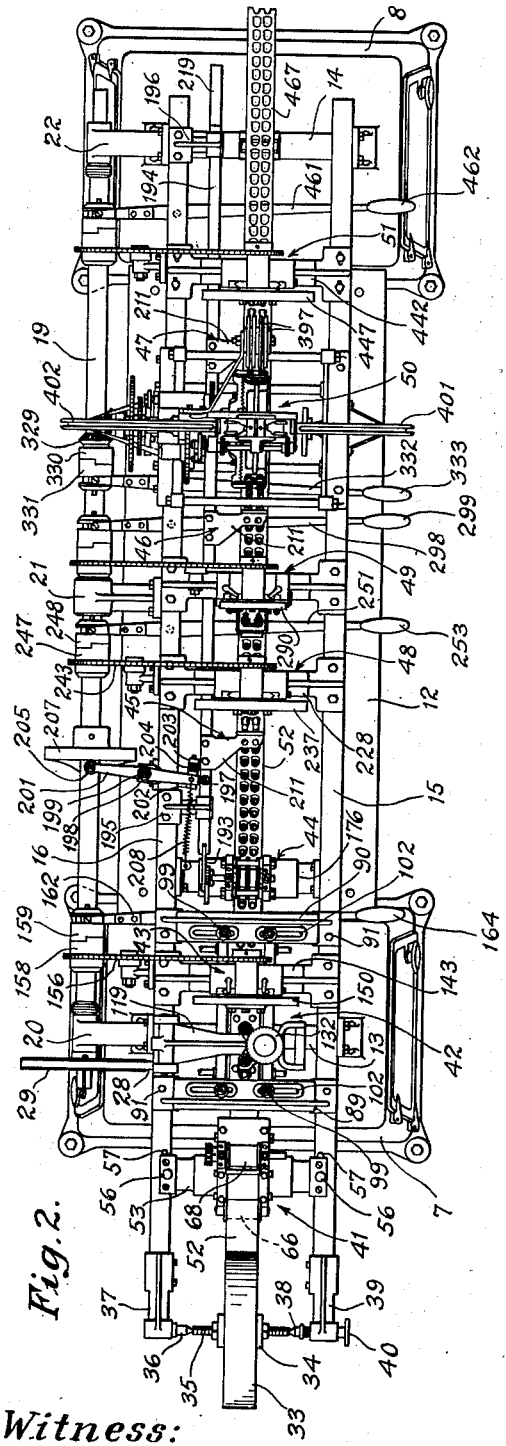
Fig. 2 is a plan view of the machine of Fig. 1.

In the machine shown, the plastic material from which articles are formed is supplied in the form of a long strip or ribbon which is received as a roll 33, Fig. 1. This roll is preferably wound on a suitable hub 34, Fig. 2, having a spindle 35 concentrically thereof, the ends of which are recessed to receive a rear pin 36 extending from a bracket 37 secured to the rail 16 and a forward pin 38 which is spring-pressed inwardly into engagement with the spindle 35 and is mounted in a bracket 39 secured to the rail 15. The arrangement is such that when a roll 33 is to be changed, a handle 40 secured to the pin 38 may be withdrawn, compressing the spring surrounding this pin and permitting the roll to be changed as will be obvious from the foregoing description. Any other means for supplying plastic material to the apparatus in the form of an elongate strip or ribbon could be used in place of that herein shown and described as desired.

In the machine shown, the ribbon passes along a predetermined path, along which are arranged a plurality of units, each of which performs a certain operation on the ribbon in the forming of articles therefrom. These units comprise a flanging unit 41, a heating unit 42, a forming or shaping unit 43, a material driving or moving means including a pair of driving rolls and associated mechanism 44, and a plurality of pusher finger units associated with other units as hereinafter described, these pusher finger units being indicated at 45, 46 and 47. There are also provided along the path of the ribbon of plastic material a perforating unit 48, an adhesive applying unit 49, a cotton unit 50, and a cutout unit 51. These units will be described in separate sections hereinafter.

Flanging unit 41, Figs. 1, 2, 5 and 7

The plastic material to be used as a basis for forming the articles is drawn off the roll 33 in a strip 52 by means hereinafter to be described and is first passed through the flanging unit 41. In this unit the lateral edge portions of the strip 52 are bent at angles to the plane of the main body of the strip, in this case into substantially vertical planes and downwardly about longitudinally extending parallel fold lines. This is effected between a pair of rolls as hereinafter specifically set forth, one of these rolls having end flanges extending over the ends of the other of the rolls.

As shown in the accompanying drawings, the unit 41 is mounted upon a supporting frame 53 from the rails 15 and 16. The frame 53 has angularly disposed portions engaging the insides of these rails and the undersides thereof. To these portions are secured top cover plates 54 by bolts 55. Threaded through the plates 54 are set screws 56 adapted to bear upon the upper surfaces of the rails 15 and 16. In this way the entire unit 41, all of which is carried by the frame 53, may be adjusted longitudinally of the machine and secured in adjusted position by the set screws 56. Suitable stops 57, Fig. 2, are provided for determining the endmost limit of the adjustment as aforesaid toward the heating unit 42.

The principal body portion of the flanging unit comprises a pair of side frame members 58 which are secured to the frame 53 as by bolts 59, there being a suitable plate 60 of heat insulating material between the frame members 58 and the frame 53. The frame members 58 are connected at their tops by a member 61 which serves as a lower entrance guide for the strip 52. Above the lateral edges of the member 61 are guide strips 62 between which is formed the entrance guideway for the strip 52 of plastic material. The members 62 and 61 are secured to the frame members 58 by suitable bolts 63 as shown. Resting upon the plastic material strip as it passes over the member 61 and between the members 62 is a cover member 64 which has adjacent to its right hand end, as seen in Fig. 5, an upturned flange portion 65, the lateral ends of which abut against upstanding portions of the frame members 58 as seen in Fig. 7.

On entering the flanging unit 41 the strip 52 of plastic material passes over a flanged idler roll 66, Fig. 5, so as accurately to guide it into the space between the members 61 and 64, the shaft of the roll 66 being suitably journaled in the frame members 58.

The effective shaping of the strip in the unit 41 is accomplished by cooperating rolls including a cylindrical lower roll 67 and a flanged upper roll 68, the latter having end flanges 69 extending over the ends of the roll 67. The lower roll 67 is mounted on a shaft 70 journaled in suitable bearings in the frame members 58, while the upper roll 68 has its shaft mounted in rectangular bearing blocks 71, Fig. 1, which are arranged for vertical movement between pairs of parallel guide portions integral or rigid with the frame members 58. The upper ends of these guide portions are connected together at each side of the device by bridging members 72. Extending upwardly from and secured to the bridging member 72 on each side is a pin 73, the upper end of which is threaded and provided with a vertically adjustable stop collar 74. Vertically slidably mounted on each pin 73 is a collar 75 which is urged downwardly on the pin 73 by a compression spring 76. Each collar 75 rests upon a pair of pins 77, Fig. 5, extending upwardly from and secured to one of the bearing blocks 71 and passing freely through holes in the associated bridging member 72. The arrangement is such, therefore, that the compression of the springs 76 urge the bearing blocks 71 downwardly in their guides, the compression of the springs 76 being adjustable by threading the collars 74 up or down on the pins 73.

At their right hand ends, as seen in Fig. 5, the frame members 58 are connected together by upper and lower exit guide members 78 and 79, which are secured to the frame members by bolts 80 and are spaced apart a suitable distance to accommodate the strip 52 with the downturned flanges thereof. The frame members 58 are also connected together and spaced apart by a spacing rod 81, the ends of which are reduced in diameter to pass through small diameter holes in the frame members 58 and are provided with suitable nuts 82 at their outer ends.

The rolls 67 and 68 are geared together at their rear ends by gears 83 and 84 which are secured to the shafts of these rolls so that they will turn in unison. They are not, however, driven except by the passage of the ribbon 52 of plastic material therebetween.

Suitable means, here shown as a heating element 85, Fig. 5, may be provided for supplying sufficient heat to the material of the strip 52 so that the edge portions thereof may be permanently bent downwardly to form flanges as hereinabove explained. This element is formed as a metallic block 86, Fig. 7, provided with a pair of bores 87 in which may be located electric heating elements of the resistance type. Suitable wires 88, Fig. 5, may lead to the electric elements in the bores 87 from a source of electric power. The current supplied to the heating elements is preferably controlled in a desired manner, as by a rheostat (not shown), in order that the heat supplied to the material may be regulated in accordance with the characteristics of the plastic material being used. It is preferable that the material be heated just sufficiently so that the edge portions thereof may be permanently bent into flanges, as above set forth, without heating it to such an extent that any distortion could occur in the main body of the material itself under the influence of the heat.

*Heating unit 42, Figs. 1, 2, 5 and 8*

The next step performed on the material of the strip 52 is to heat the central body portion thereof sufficiently so that the material thereof becomes plastic and moldable. If this were done to the extent to which it is done according to the present invention, without adequate support for the heated portion of the strip, it would be impossible to prevent such distortion of the material of the strip as would render the further operations impossible. It is necessary therefore, especially when working with relatively thin material, to support certain at least of the portions of the strip arranged about the heated portion against relative movement, so that the central portion which is heated and which is not self-sustaining at the temperature to which it is heated, will be prevented from distorting to such a degree that further operations cannot be effected. This is accomplished according to the present invention by maintaining the strip under a sufficient longitudinal tension coupled with maintaining the lateral edge portions of the strip relatively cool and hence rigid, and preventing these rigid edge portions from relative movement. To this end means are provided for guiding the flanged edge portions of the strip formed as aforesaid in unit 41 through positively cooled guides.

Turning now to the drawings, particularly Figs. 5, 8 and 9, a pair of frame members 89 and 90 are provided extending between the rails 15 and 16 and suitably secured thereto by bolts 91, Fig. 8, or in any other desired manner. The lateral edge portions of the strip 52 is supported by lower guide members 92 and 93 above which are upper guide members 94 and 95. The guide members 92 and 93 have vertical longitudinally extending slots 96 formed therein to accommodate the downturned flanges of the strip 52; while the upper guide members 94 and 96 have their under surfaces recessed sufficiently to accommodate the thickness of the horizontal plane portion of the plastic material strip. All the guide members 92 to 95 are provided with hollow temperature controlling chambers 97 to and from which a temperature controlling fluid may be passed through suitable pipes 98. When using thermoplastic material for which the machine now being described was specifically intended, the chambers 97 will be provided with a cooling fluid to maintain the edge portions of the strip cool and hence rigid, so as to prevent undesired attenuation of the strip under the influence of the longitudinal tension exerted thereon while the central portion thereof is heated and while the parallel slots 96 prevent relative lateral movement of the edge portions of the strip.

Means are provided for suspending the guides 92 to 95 from the transverse frame members 89 and 90 in such a way as to accommodate strips of various widths. For this purpose, the guides 92 and 94 on the one hand and 93 and 95 on the other are suspended from the frame members 89 and 90 at each end by specially shaped bolts 99, Fig. 5. These bolts have reduced lower end portions passing through the lower guide members while larger diameter portions pass through apertures in the upper guide members, there being a shoulder between these two portions abutting the upper sides of the lower guide members, as best seen in Fig. 5. The bolts 99 are suitably secured to the lower guide members by nuts 100 at the lower ends thereof. These bolts each have a flange 101 for engaging against the underside of the transverse frame members 89 and 90 and have non-circular portions extending upwardly through slots 102, Fig. 2, in these frame members. The bolts 99 are secured to the frame members 89 and 90 by nuts 103 threaded on their upper ends and tightened against the frame members. Thus the lower guide members 92 and 93 are rigidly secured to the transverse frame members 89 and 90 at their ends so as to predetermine the underside of the path of the strip 52 of plastic material, while permitting lateral adjustment of the guides 92 and 93 by loosening the nuts 103 and moving the bolts 99 laterally in the slots 102. The upper guide members 94 and 95 are provided surrounding the bolts 99 adjacent to the lower portion of the apertures through which these bolts extend with inwardly extending flanges, between which and the flanges 101 on the bolts 99 are arranged compression springs 104. Thus, the upper guide members 94 and 95 will be adjustable laterally simultaneously with the respectively associated lower guide members 92 and 93, while the upper guide members will be resiliently urged downwardly into contact with the upper surface of the strip 52 of plastic material at the lateral edges thereof by the compression of the springs 104.

While it is possible to heat plastic material which is relatively thin to an adequate extent by heat supplied thereto from but one side, it is preferred to supply heat to the material from both sides thereof, in this case from above and below, by means which supply the heat primarily by radiation. Such means in the present instance comprise metallic blocks including a lower block 105, Figs. 5 and 8, which is provided with suitable bores as indicated at 106 in which heating units preferably of the electric resistance type may be provided, such units being supplied with current through wires 107 from a suitable source of power, there being preferably interposed in the line suitable current controlling means, such as a rheostat (not shown).

The block 105 is provided on its underside with a heat insulating panel 108 which is apertured to permit the attachment to the block 105 of a bracket 109 formed in the shape shown in Fig. 5. The bracket 109 is secured to an L-shaped bracket 110, the vertical leg of which is provided with a slot 111 through which passes a screw 112 threaded into a stationary bracket 113. The bracket 113 has a laterally extending portion secured to the leg 13 of the machine by a bolt 114 and is provided with a guide channel in which the vertical slotted portion of the bracket 110 is slidable. By this construction the heating block 105 may be vertically adjusted and the adjustment secured by tightening the screw 112.

Arranged above the path of the strip 52 of material is an upper heating block 115, which is somewhat shorter in longitudinal extent than the block 105, but is otherwise constructed in a similar manner and is similarly provided with a plurality of electric heating elements 116 supplied with current from wires 117 from a suitable source of power and under control of suitable means as a rheostat (not shown). The controls for the temperatures of the upper and lower blocks 115 and 105 are preferably independent of each other. The block 115 may be surrounded by a casing 118 of heat insulating material if desired.

The block 115 is carried by a transversely extending arm 119 and is suitably vertically adjustable in respect thereto in a manner hereinafter to be described. The arm 119 is pivoted at 120 to a bracket 121, which is in turn secured to the rail 16 of the machine. At its forward end, the arm 119 has a handle 122 which may be manually grasped to lift the arm 119 and swing it about the pivot 120 to raise the upper heating block 115 out of heat-transferring relation with the strip of plastic material by movement from the full line to the dotted line positions, Fig. 8. This is normally done when for some reason movement of the strip 52 is stopped for any substantial period, in order to prevent overheating of the strip and damage to the material thereof. Suitable stops are provided on the arm 119 and the bracket 121 respectively for predetermining the terminal positions of the arm on the manual swinging movement above described, including a stop 123 on the arm 119 adapted to engage a fixed flange or web 124 of the bracket 121 to predetermine the dotted line position of the arm and associated parts, Fig. 8, and an abutment 125 on the arm 119 arranged to engage the upper end of an adjustable stop 126 secured to an inwardly extending portion of the bracket 121. The operative position of the arm 119 can thus be adjustably determined by the adjustment of the stop 126.

The block 115 is provided with a pair of bolts 127 secured therein and extending upwardly therefrom loosely through suitable bores in the arm 119 and through sleeves 128 and a plate 129 resting upon or secured to the sleeves 128. Above the plate 129 are a pair of nuts 130 threaded on the bolts 127 and provided with small pinions 131, both of which mesh with a gear 132 journaled about a stub shaft which is mounted in the plate 129. Secured to the gear 132 for rotation about this stub shaft is a hand wheel 133. Thus, rotation of the hand wheel 133 will rotate the gear 132 and simultaneously rotate the nuts 130 to adjust the block 115 vertically in respect to the arm 119.

Also secured in the plate 129 is a thermometer tube 134, this tube passing loosely through the plate 129 and having threaded thereon above and below this plate lock nuts 135 to secure the tube in position. In this tube is a suitable thermometer which extends down into the block 115, as indicated at 136, for giving a visual indication of the temperature of the block 115. In forming certain types of thermoplastic material, for example cellulose acetate, this temperature may be about 325° C. when operating at a relatively high rate of speed.

*Forming or shaping unit 43, Figs. 1, 2, 5 and 9*

As shown in the accompanying drawings and as carried out in the machine corresponding thereto, the articles are formed from the heated portion of the ribbon 52 by a pair of cooperating dies, including upper male dies 137 and lower female dies 138. The upper dies 137 are interchangeably secured by bolts 139 to a temperature controlling chamber 140, which in turn is secured to the lower head of a slide 141. The slide 141 is mounted in suitable guides 142 formed in a large transversely extending bracket 143, which is secured as by bolts 144 to the rails 15 and 16. The lower die 138 is also interchangeably secured through spacing blocks 145 to the upper head of a slide 146 arranged for movement in guideways 147 aligned with the guideways 142 and in the lower portion of the bracket 143.

Means are provided for moving the slides 141 and 146 to bring the dies substantially simultaneously into cooperative relation with the heated central portion of the strip 52. For this purpose, the slides 141 and 146 are respectively provided with cam rolls 148 and 149 which respectively engage the peripheries of upper and lower cams 150 and 151. The cams 150 and 151 are suitably mounted on shafts 152 and 153 respectively which extend parallel to each other and longitudinally of the entire machine and are journaled in suitable bearings in the frame 143. At their ends opposite from the cams 150 and 151, the shafts 152 and 153 have secured thereto similar sprocket wheels 154 and 155. About these sprocket wheels there is passed a sprocket chain 156 which passes around and is driven by a sprocket wheel 157 mounted loosely on the drive shaft 19 and arranged to be driven thereby through a suitable slide clutch. This clutch includes a member 158, Fig. 2, secured to the sprocket wheel 157, and a complementary clutch member 159 splined on the shaft 19. These clutch members have but a single position of engagement with one another, so that when the sprocket 157 is driven, it will always be in synchronized timed relation with the rotation of the shaft 19. The clutch member 159 has an annular groove formed therein arranged to receive a pair of rollers 160, Fig. 9, mounted on shafts extending inwardly from the bifurcated end portions 161 of a clutch operating lever 162. The lever 162 is pivoted at 163 to a bracket secured to the rail 16 and has at its forward end a handle 164. Depending from the rail 15 is a bracket 165 surrounding the lever 162 and provided with a pair of detents (not shown) engaging said lever, so that the lever will be held against undesired movement at either of its terminal positions, i. e., with the clutch 158—159 either in or out. The sprocket chain 156 also passes about an intermediate idler sprocket 166 mounted on a short shaft which is journaled in a bracket 167 secured to the rail 16 as shown in Fig. 9.

Thus, as the sprockets 154, 155 and 157 all have the same number of teeth, the cams 150 and 151 will be rotated a single revolution for each revolution of the shaft 19 and will be maintained in synchronism with the rotation of this shaft, which is similarly synchronized with the other operating means of the machine as hereinafter set forth.

For retaining the cam rollers 148 and 149 in engagement with their associated cams 150 and 151 and for retracting the dies from engagement with the material when this action is permitted by the position and configuration of the cams, the slides 141 and 146 have secured thereto tension springs 168 and 169 respectively, the opposite ends of which are secured to brackets 170 and 171 respectively, carried by the frame 143. The effect of this construction is to provide a means for forcing the dies positively into engagement with the plastic material while resiliently withdrawing them therefrom.

It is desired that the material being shaped be rigidified concomitantly with the shaping thereof. For this purpose, the dies are controlled as to temperature. As shown, there is provided a chamber 172 in the member 140 to and from which temperature controlling fluid may be passed by pipes, one of which is shown in Fig. 5 at 173; while the lower dies 138 are similarly provided with a temperature controlling chamber 174 to and from which temperature controlling fluid may be passed through suitable pipes, one of which is shown at 175.

It will be understood that when the device is operating with thermoplastic material, the dies will normally be kept somewhat cooler than the softening point of the material by circulating a cooling media through the chambers 172 and 174. On the other hand, if thermosetting material is being worked, a heating medium may be passed through these chambers for effecting rigidification of the material during and preferably substantially coextensive with the shaping thereof.

*Material moving means—Unit 44, Figs. 1, 2, 5 and 10*

Means are provided in the machine for moving the material therethrough, particularly through the flanging, heating and forming units previously described, and for maintaining the ribbon 52 of plastic material under longitudinal tension during the passage thereof through the heating and forming units. For this purpose, the unit 44 is provided with a pair of rolls which are positively but intermittently driven to draw the ribbon 52 through the portion of the machine up to this point, the requirement that the ribbon 52 drive the rolls 67 and 68 of the unit 41 serving to maintain the ribbon between the units 41 and 44 under a desired tension. This tension is to a certain extent at least controlled by the tension of the springs 76 urging the rolls 68 and 67 together.

Unit 44 is in many respects similar to unit 41 in that it is mounted on a frame member 176, Fig. 10, which in this case is rigidly mounted on the rails 15 and 16 by bolts 177. Supported upon the frame 176 are a pair of plate-like frame members 178 and 179, which are bolted to the frame 176 by bolts 180 and are connected together by a plurality of spacing members 181 having reduced end portions passing through the frame members 178 and 179 and provided with nuts 182 threaded on their outer ends. Journaled in the frame members 178 and 179 is a shaft 183 carrying a roll 184 which has a plurality of knurled portions 185 separated by annular channel portions 186 to permit passage of the depressions formed in the ribbon 52. Above the roll 184 is a roll 187, which is of smaller diameter than the roll 184 and is adapted to keep the plastic material in contact with the knurled portions 185 of the roll 184, being provided with complementary knurled portions for this purpose. The roll 184 is mounted in fixed bearings as above set forth, while the roll 187 has its bearings formed in vertically slidable blocks 188, Fig. 1, corresponding to the blocks 71 of unit 41 and urged downwardly by the same type of mechanism, which is generally indicated at 189. The description of this mechanism will not be repeated as it is substantially the same as that previously described for the unit 41.

While it is contemplated that the material could be driven continuously through the machine if means were provided in connection therewith for forming material during the movement thereof, the present machine is designed for intermittent operation, that is, the material is moved intermittently therethrough, the several means for operating on the sheet or ribbon other than the heating means, cooperating therewith during the dwell periods in the movement thereof. Thus the forming means, unit 43, forms shaped depressions in the ribbon while it is stationary, and in the manner previously set forth.

Means are therefore provided for moving the material intermittently through the apparatus, which in the present instance, comprise means for rotating the roll 184 intermittently, the roll 187 not being positively driven.

For this purpose, the shaft 183 of the roll 184 is provided to the left of the frame member 178, Fig. 10, with a ratchet wheel 190 with which cooperates a pawl 191 pivoted to a swinging arm 192, which is arranged for free rotation about the axis of the shaft 183. Suitable spring means (not shown) are provided for urging the pawl 191 against the ratchet 190 in the usual manner. The arm 192 is connected at a point spaced from the axis of the shaft 183 through a link 193 with the left-hand end as seen in Fig. 5 of a longitudinally reciprocating bar 194. The bar 194 extends for substantially the remainder of the length of the machine, that is to the right of the unit 44, as seen in Figs. 5 and 6, being mounted for longitudinal reciprocating movement in suitable bearings formed in brackets 195 and 196, which are carried by the rail 16.

For reciprocating the bar 194, this bar has pivoted thereto at 197, Fig. 2, a lever 198, Fig. 10, the outer or rear end of which is bifurcated to embrace a bolt 199 securely mounted in a bracket 200 which extends rearwardly from the rail 16. Mounted for pivotal movement on the bolt 199 is a second lever 201, the inner end of which is disposed between an upstanding portion 202 of the lever 198, Fig. 2, on the one side and a second upstanding portion 203 of the lever 198 on the other side. Extending between the portion 203 and the adjacent side of the lever 201 is a compression spring 204. Thus, referring to Fig. 2, when the lever 201 is moved clockwise about its pivot on the bolt 199, the left-hand inner end will engage the upstanding portion 202 of the lever 198 to move the bar 194 to the left with a positive movement. If the lever 201 is moved counterclockwise, it will
move the bar 194 from left to right with a re-
silient movement through the compression of the spring 204 disposed between the inner end of the lever 201 and the adjacent upstanding portion of the lever 198.

The outer or rear end of the lever 201 is provided with a depending cam roller 205 cooperating with a track 206 formed on a cam 207 which is secured to the drive shaft 19. The inner or forward end of the lever 201 is connected by a tension spring 208 to a fixed anchorage, which in this instance is a bracket on the frame member 176. Thus, the spring 208 serves to maintain the roller 205 against the track 206 of the cam 207 and provides the force necessary to move the bar 194 from right to left when this action is permitted by the contour and position of the cam track 206. Thus, the bar 194 is reciprocated in response to the cam 207, but the movement in both directions is made resilient, that from left to right being cushioned by the spring 204 and that from right to left being in response to the tension of the spring 208. Furthermore, inasmuch as the shaft 19 makes a single revolution during the mechanical cycle of the apparatus, the bar 194 will make a single complete reciprocation during this same period to index the roll 184 a predetermined distance during each mechanical cycle of the machine. It will be understood that the cam track 206 is of such shape and so positioned on the shaft 19 as to impart the desired movement to the ribbon 52 through the apparatus.

*Material drive—Pushing and locating means—
Units 45, 46 and 47, Figs. 1, 2, 5 and 6*
While the rolls 184 and 187 of the unit 44 serve to draw the material through the heating and forming units, it is desired that certain of the subsequent units, particularly the perforating unit 48, the cotton unit 50 and the cut out unit 51 be provided with means for moving the ribbon 52 in a substantially positive manner to these units and locating the formed portions of the ribbon accurately in respect thereto. Inasmuch as these material actuating units 45, 46 and 47 are all substantially alike in construction, with the exception of the lengths of the fingers, as hereinafter set forth, but one will be described, the same reference characters being used on similar parts of all units.

Each of these units comprises one or more pusher fingers 209, two being employed in the present instance, as there are two laterally spaced depressions in each row. Each of the pusher fingers 209 is pivoted on a transverse axis 210 to a short bracket which in turn is secured to a bracket 211 extending laterally from and secured to the longitudinally reciprocating bar 194. Thus as the bar 194 reciprocates from left to right, the right hand ends of the pusher fingers 209 will be moved by gravity to engage in the adjacent depressions, due to their right-hand ends, Figs. 5 and 6, overbalancing their left-hand ends, and will move the strip or ribbon 52 forwardly the distance between two adjacent depressions, this being the distance the bar 194 reciprocates subsequent to the engagement of the right-hand ends of the fingers 209 in adjacent depressions.

Means are provided for determining the limits of movement of the fingers 209. For this purpose, the bracket 211 is provided with a forwardly extending bracket 212 through which extend adjustable screws 213 having lock nuts thereon for securing the adjustments once made. Similar screws 214 having lock nuts 215 thereon cooperate with rearwardly extending portions 216 of the associated fingers 209. The screws 213 and 214 prevent excess movement of the fingers 209 in either direction, so that these fingers will engage successive rows of depressions formed in the strip 52 as previously set forth. The reciprocation of the bar 194 in the manner heretofore explained will serve to move the strip 52 forwardly a predetermined distance during each machine cycle and to locate the depressions therein accurately in respect to the operating units 48, 50 and 51 with which the respective moving units 45, 46 and 47 are associated.

*Perforating unit 48, Figs. 1, 2, 5 and 11*

The next operation to take place on the formed depressions in the strip 52 is to perforate the bottoms thereof so as to provide a through passage for a person to breathe when using the nasal inhalers, to the manufacture of which the present machine is adapted.

In order that the perforation of the depressions be accurate, means are provided for guiding the ribbon 52 in a predetermined path opposite this unit. For this purpose, the ribbon 52 is guided by slide plates 217 having longitudinal slots therein for accommodating the downwardly extending flanges at the edge portions of the strip, these plates being secured to a laterally extending bracket 218 secured to a longitudinally extending stationary bar 219. The bar 219 is rigidly secured to the brackets 195 and 196 in which the bar 194 is arranged for longitudinal reciprocation, these bars being disposed one above another as best seen in Figs. 11, 12, 13 and 14. Above the plates 217 are disposed spring plates 220, which overlie the lateral edge portions of the ribbon 52 and are urged resiliently downwardly by compression springs 221 surrounding bolts 222 which are secured in the plate 217 or the bracket 218, or both, and which extend loosely through the plates 220, the springs 221 being confined between heads of the bolts 222 and the upper surfaces of the plates 220. The underside of the bracket 218 is suitably cut out to provide for clearance of the associated parts of the depressed portions of the ribbon 52 and the operating mechanism of the machine, as seen in the drawings.

The perforation of the depressed portions of the ribbon 52 is effected by upper die means 223 which have perforations therein and with which cooperate punches 224 disposed below the path of the ribbon and in alignment with the perforations of the dies 223. These parts are brought together so that the dies 223 enter into the depressions in the ribbon and center them while serving as a means against which the ribbon may rest during the perforation thereof by the punch members 224. The die members 223 are interchangeably carried by a supporting member 225, which is in turn secured to the lower end of an upper slide 226 arranged for vertical reciprocation in guideways 227 formed in a frame member 228 which is secured to the rails 15 and 16 in any suitable manner, as by bolts 229. The punches 224 are interchangeably secured to a suitable mounting means 230, carried by the upper end of a lower slide 231 which is mounted for vertical reciprocation in guideways 232 formed in the lower portion of the frame member 228.

Means are provided for reciprocating the upper and lower slides 226 and 231. For this purpose, these slides are respectively provided with cam rollers 233 and 234 which work in closed cam tracks 235 and 236 of cam plates 237 and 238 respectively. The cam plates 237 and 238 are respectively mounted upon shafts 239 and 240 suitably journaled in bearings formed in the frame 228 and having at their rear ends sprocket wheels 241 and 242 respectively. Around these sprockets is trained a sprocket chain 243, this chain also passing around an intermediate idler 244 carried by a bracket 245 from the rail 16 and around a driving sprocket 246 mounted for free rotation about the axis of the shaft 19.

As best seen in Fig. 2, the sprocket wheel 246 is carried by one member 247 of a single tooth type of clutch, the other member 248 of which is provided with an annular groove to receive inwardly directed rolls 249, Fig. 11, mounted on the bifurcated ends 250 of a clutch lever 251 which is pivoted at 252 to a bracket extending downwardly from the rail 16 and has a handle 253 at its forward end. A suitable bracket housing 254 is provided having a slot in which the lever 251 moves and provided with suitable detents (not shown) for holding this lever at the opposite ends of its throw against accidental dislodgment so as to hold the clutch, including members 247 and 248 in or out. The arrangement is thus similar to that previously described for the shaping unit 43 as the sprocket wheels 246, 241 and 242 are of the same diameter, so that the cam plates 237 and 238 make a single revolution for each revolution of the drive shaft 19 and thus for each machine cycle. Furthermore, as the clutch members 247 and 248 have but a single point of engagement, the perforating unit, when operating, must always be synchronized with the remainder of the apparatus.

As previously stated, the die members 223 are provided with perforations therein so that the bits which are punched out from the ribbon will be moved upwardly through these perforations into a hollow space 255 formed in the member 225 and in the head of the slide 226 and thence will pass through a chute 256 carried by the head of the slide 226 or the member 225 to be discharged into a stationary chute 257 to a point where they will not interfere with the production of articles by the machine. They may be directed thence to a desired collecting point in any preferred way (not shown).

*Adhesive applying unit 49, Figs. 1, 2, 6, 12 and 15*

The next step in the process of forming nasal inhalers carried out by the machine of the accompanying drawings is to apply an adhesive, such as glue, to the interior of the depressions formed in the ribbon 52 as aforesaid and perforated by the means just described. This is the function of unit 49.

Associated with this unit, as in the case of the perforating unit just described, is a means for guiding the ribbon 52 of plastic material so that the means operating thereon may accurately engage the depressions therein. For this purpose, the longitudinal bar 219 has connected thereto a laterally disposed bracket 258, Fig. 12, which has thereon plates 259 having longitudinal slots formed therein to receive the downwardly extending flanges of the ribbon 52. Above the plates 259 are plates 260 adapted to engage and guide the upper surface of the ribbon at its lateral edges. This construction differs, however, from that described for the perforating unit in that the members 260 and 259 are securely bolted together; and one or both of these members of each pair are recessed to a sufficient extent to permit the passage of the ribbon therebetween. No resilient means are provided, as in the case of the guiding means associated with the perforating unit. It is contemplated, however, that either of these strip guiding means could be used in association with any of the units as may be desired or necessary.

Also, as shown in Fig. 12, the rails 15 and 16 have extending therebetween a transverse bracket 261 which is secured to these rails by bolts 262 and serves in cooperation with the rail 16 to support the bracket 21 carrying the intermediate bearing for the drive shaft 19. This construction is merely to impart rigidity to the entire structure and has no other operating function.

The unit 49 comprises broadly a means for filling predetermined amounts of a fluid into the cavities formed in the ribbon 52. In the particular embodiment of the invention herein disclosed, this fluid is an adhesive material and but very small amounts of it are supplied to the interior of each of the formed cavities of the ribbon 52 for the purpose of holding the filling material later to be inserted therein in such cavities.

Referring now to Figs. 1, 2, 6, 12 and 15, and particularly Figs. 6 and 15, there is provided a container 263 for a bath 264 of a desired fluid, which in this case is an adhesive material, such as glue, which may be melted and maintained fluent by heat. The container 263 has a pair of nozzle portions 265 secured to its lower end, each providing a plurality of lateral openings 266. Each nozzle is of such shape as substantially to fit the interior of one of the depressions of the ribbon 52 as indicated in dotted lines in Fig. 15, the openings 266 being spaced apart and opening to the sides of the end of the nozzle. It will be understood that the nozzles 265 may be interchanged for other nozzles of desired shapes when differently shaped receptacles or depressions are to be filled.

The container 263 further has associated therewith a holder 267 having a bore 268 therein in which may be located an electric heating element for heating the glue of the bath 264 and maintaining it in a suitable fluent condition, a set screw 269 being provided to hold the electric heating element in the bore 268.

The container 263 is suitably mounted on a slide 270 which is arranged for sliding movement in a direction slightly inclined to the vertical, as shown in a pair of guides 271, Fig. 12. The purpose of this inclination in the device shown is that the nozzles 265 may be inserted substantially axially of the somewhat inclined depressions in the ribbon 52. It is contemplated, however, that when the depressions of the ribbon 52 are formed with their axes substantially vertical, the slide 270 may be mounted for vertical movement. The guides 271 are formed on a slide 272, which is in turn mounted for sliding movement in guideways 273 formed in a main frame member 274, substantially parallel to the guides 271. The frame member 274 is arranged to be mounted upon the rails 15 and 16 by any suitable securing means, such as bolts 275.

The lower inner end of each nozzle 265 is formed cylindrical as a pump chamber 276 for cooperation with the cylindrical end 277 of a plunger member 278, which is mounted for sliding movement in a direction parallel to the movement of the slides 270 and 272 in a sleeve 279. The sleeve 279 is held in a bore of a bracket 280 parallel to the axis of the plunger 278 by lock nuts 281 and 282 threaded on the sleeve 279 and engaging the opposite ends of the bracket 280. The bracket 280 is suitably secured at 283 to the slide 272 as by a pin or other desired means. The plunger 278 has secured in its upper end a transverse pin 284 passing through an elongate slot 285 in the sleeve 279 for limiting the movement of the plunger in respect to the sleeve 279. At its upper end the sleeve 279 has threaded therein a plug member 286 having a lock nut 287 thereon engaging the upper end of the sleeve to secure the longitudinal adjustment of the plug member once made. Between the lower end of the plug member 286 and the upper end of the plunger 278 is disposed a compression spring 288.

While the nozzle and plunger member associated therewith have been described hereinabove as single, it will be understood that as there are two depressions in the ribbon 52 transversely thereof in each row, two similar means including a nozzle, such as shown at 265, and a plunger, shown at 278, and associated means will be provided, as shown in Fig. 12, these means being similar, so that only one need be described.

Means are provided for moving the slide 272 in the guideways 273. For this purpose, the slide is provided with a cam roller 289 mounted thereon on a substantially horizontal axis, as shown in detail in Fig. 15. This cam roller cooperates with the periphery of a cam 290 which is mounted on a horizontal shaft 291 extending longitudinally of the machine and journaled in the frame member 274. At its right-hand end as seen in Fig. 6, the shaft 291 carries a sprocket wheel 292 around which is trained a sprocket chain 293 which passes over an intermediate idler 294 mounted on a pin 295 laterally adjustable in a slot 296 in the frame 274, and also passes around a sprocket 297 mounted for free rotation about the axis of the shaft 19. A suitable clutch means similar to those previously described is provided for driving the sprocket 297 from the main drive shaft 19, this clutch means being operated by a lever 298 having a handle 299 thereon similar to the clutch means previously described for the forming unit 43 and the perforating unit 48. Inasmuch as the sprockets 297 and 292 are of the same diameter and pitch, the cam 290 will be given a single complete revolution for each revolution of the drive shaft 19 when the unit is in operation, and, hence, the unit will be properly synchronized with the other operating units of the machine.

The guide members 271 have secured thereto adjacent to their lower ends stop members 300 arranged to be engaged by the laterally extending ends of a cross bar 301 secured to the slide 270. Tension springs 302 extend between the ends of the cross bar 301 and suitable anchorages 303 secured to the slide 272. The springs 302 will thus normally tend to move the container 263 and the slide 270 to their lowermost positions in respect to the slide 272. The throw or movement of the slide 272 by the cam 290 is, however, more than sufficient to move the container 263 and its associated nozzles 265 between the full and dotted line positions, Fig. 15. There are provided, therefore, suitable adjustable stops 304, shown as bolts extending through lugs carried by the guideways 273 of the frame 274, which are arranged to be engaged by the ends of the transverse member 301 at the time the container 263 and the nozzles 265 arrive at the dotted line position, Fig. 15, which is the farthest downward position to which it is desired to move this container and the nozzles as the nozzles are then seated in associated depressions of the ribbon 52.

Further downward movement of the slide 272 results in a relative movement between this slide and the slide 270, the latter now being stationary, so as to cause a relative movement between the lower ends 277 of the plungers 278 and the pump chambers 276 to force fluid of the bath 264 out through the openings 266 of the nozzles. This pump movement is cushioned, however, by the springs 288, and upward movement of the plungers 278 in respect to the sleeves 279 is limited by the lengths of the slots 285 in which the pins 284 operate. The result is to force predetermined amounts of the fluid of the bath 264 through the openings 266 into the interiors of the depressions of the ribbon 52 after the nozzles 265 have been seated therein at the dotted line position of the parts shown in Fig. 15.

Retractive movement of the slide 272 is caused when the roller 289 comes opposite a lower portion of the cam 290 by a pair of tension springs 305 extending from the upper end of the slide 272 to brackets 306 which are secured in the frame 274. The springs 302 operate on the retraction of the slide 272 to move the container 263 and the slide 270 secured thereto relative to the slide 272 to bring the parts to their full line positions, Fig. 15, and thus to complete the cycle of operation of the apparatus.

Cotton unit 50, Figs. 1, 2, 6, 13 and 16

The so-called "cotton unit" is for the purpose of providing a filling of absorbent material, which is received in the form of a sliver or loosely wound rope, then wound into a wad or roll which is preferably shaped to a desired contour, and then inserted into the depression of the ribbon. While cotton is used in filling nasal inhalers, to the making of which the present machine is adapted, it is contemplated that other types of filling material may be used with apparatus broadly or narrowly similar to that presently to be described in detail. Furthermore, while the present apparatus is intended to supply an annular roll of filling material to the depressions of the ribbon leaving an aperture therethrough, through which a person may breathe, it is contemplated that the roll may in effect be solid rather than having an aperture therethrough.

Associated with the cotton unit 50 is a means for guiding the ribbon 52 of material having the formed and perforated depressions therein to which adhesive has been applied, as previously described. The means used for guiding the material as shown is essentially the same as that employed in conjunction with the perforating unit 48, with the exception that certain of the parts are cut out to a somewhat different extent to provide for clearance of other parts hereinafter specifically described. Inasmuch, however, as these differences do not affect the principles of the construction, but merely affect the detailed shapes of certain of the parts, the means used for this purpose will not be described in detail, but the parts are given the same reference characters as those used in describing corresponding parts in conjunction with the perforating unit 48. Reference may be made to the description of that unit for the construction of the material supporting means associated with this unit.

Associated with the cotton unit is an undersupport for the depressions in the ribbon, which co-operates therewith to center the depressions by engaging the external faces thereof and which has pins arranged to extend through the perforations of the depressions formed as aforesaid by unit 48 in order to center the filling material when it is applied thereto and to maintain breathing passages therethrough. This means will first be described.

As shown there is provided a member 307, Figs. 6 and 13, having a pair of depressions therein corresponding in shape to the external contour of a pair of depressions transversely of the ribbon 52. These depressions have arranged centrally therein pins 308 secured in the member 307 and arranged to extend through the perforations in the bottoms of the depressions in the ribbons 52. The member 307 is interchangeably carried by the upper head 309 of a vertical slide 310, which is mounted for vertical sliding movement in a pair of guides 311, Fig. 6, formed in a transverse casting 312. The casting 312 has a pair of lugs 313 having transverse bores therein through which extend spacing rods 314 extending between a front frame member 315 and a rear frame member 316 which constitute the principal frame work of the cotton unit. The lugs 313 are suitably secured to the rods 314. The front and rear frame members 315 and 316 are secured to the rails 15 and 16 respectively in any suitable manner as by bolts 317 and 318 respectively. These frame members are further tied together by a pair of spacing rods 319 disposed on each side of the unit, as seen in Fig. 16, and above the level of the rails 15 and 16. All the spacing rods 314 and 319 have reduced end portions passing through bores in the frame members 315 and 316 and provided with nuts 320 threaded on their outer ends.

Means are provided for moving the slide 310 vertically to move the member 307 into and out of cooperative relation with the undersides of the depressions in the ribbon 52. For this purpose, the slide 310 is provided with a cam roller 321, Fig. 13, cooperating with the periphery of a rotary cam 322 mounted on a transverse drive shaft 323 by which all the operating mechanisms of the cotton unit are driven. The cam 322 serves positively to move the slide 310 vertically upwardly to move the member 307 into its operative position. For retracting the slide 310 when such action is permitted by the configuration and position of the cam 322 and for retaining the roller 321 against the periphery thereof, tension springs 324 are provided extending between the lower end of the slide and the lower ends of brackets 325 which are secured to the casting 312.

The drive shaft 323 is journaled in bearings 326 in the forward bracket 315 and 327 in the rear bracket 316 and carries at its rear end a beveled pinion 328 meshing with a similar beveled pinion 329 freely mounted on and for rotation about the axis of the shaft 19. The pinion 329 carries one member 330 of a clutch, the other member 331 of which is splined to the shaft 19 and is operated by a lever 332 having a handle 333 at its forward end. Inasmuch as this clutch and its operating means is similiar to those previously described and is of the single-point-engaging type, it is deemed unnecessary at this time further to describe it in detail. The arrangement is such that when the clutch is engaged, the shaft 323 will make a single revolution for each revolution of the drive shaft 19, so that the member 307 will be brought upwardly into engagement with the undersides of the depressions in the ribbon 52 once during each mechanical cycle of the machine and in synchronism with the other parts of the cotton unit.

In the device shown in the accompanying drawings, two loose ropes or slivers of absorbent cotton are supplied respectively to a pair of spindles, one for each of the depressions spaced laterally across the ribbon 52. The manner of supply of the cotton to the spindles will be described hereinafter. The spindles are shown in Fig. 13 at 334 and are mounted radially in a head 335, there being six pairs of spindles in the device shown arranged at 60° intervals around the head 335. The spindles 334 are further arranged for rotation about their own axes in respect to the head and for this purpose are provided with shafts passing through the head and journaled in the peripheral ring portion thereof, as shown in Fig. 13. The head 335 has a plurality of spoke members 336 which are secured to a hub 337, arranged for free rotation about a large diameter stationary shaft 338. This shaft is secured in a bore in a large hub portion 339 formed as a part of the frame 316 and is prevented from rotation in this bore by one or more set screws 340.

Means are provided for rotating the head 335 intermittently about the axis of the shaft 338 in order to bring the pairs of spindles 334 successively to the several dwell positions at which these parts are shown in Figs. 6 and 16, including a winding position which is uppermost and a position at which the spindles are in axial alignment with and adjacent to the depressions of the ribbon 52 at the lowermost position of the spindles. For this purpose the hub 337 of the head 335 carries fixed thereto a gear 341 which is arranged to be driven by a gear 342 mounted on a shaft 343 which is journaled in a suitable bracket on or extension from the main frame member 316. At its rear end the shaft 343 carries a ratchet wheel 344, Figs. 13 and 16, with which cooperates a spring pressed pawl 345 mounted on an arm of a rotatable member 346 freely rotatable about the axis of the shaft 343. The member 346 has circular rack teeth 347 formed thereon meshing with rack teeth of a vertical slide 348 mounted in a suitable slideway 349 on the rear of the frame 316. At its lower end the slide 348 carries a cam roll 350 engaging the periphery of a cam 351 secured to the drive shaft 323 of the unit. A suitable tension spring 352 is provided extending between the upper end of the slide 348 and an anchorage fixed to the guide thereof, as shown in Figs. 13 and 16. Thus as the shaft 323 rotates once for each mechanical cycle of the machine and as the mechanical driving train is so constructed and arranged that the gear 341 will be given one-sixth of a revolution for each increment of movement of the ratchet 344, the head 335 will be rotated one-sixth of a revolution during each mechanical cycle of the machine and will come to a dwell position at the end of each such period of movement, the extent of the dwell being determined by the configuration of the cam 351.

A means generally indicated at 353, comprising a friction sleeve, surrounds the hub 337 and is secured at 354 to an upwardly extending bracket 355 secured to the frame member 316 so as to prevent overthrow in the rotation of the head 335 and to prevent movement thereof except as positively driven by the mechanism previously described.

Means are provided for rotating the spindles while at their uppermost position, which is the position of the pair of spindles 3 shown in Fig. 6. For this purpose the spindles of each pair have provided on their shafts intermeshing gears 356 and 357, so that when one of a pair of spindles is driven, the other will be similarly rotated but in the opposite direction. The shaft of each of the spindles carrying the gear 356 is extended radially inwardly and carries the driven member 358 of a clutch arranged to cooperate at this position of the spindles with a single driving clutch member 359, which is splined to a continuously rotating shaft 360. Thus when a pair of spindles is located at the winding position, that is vertically upwardly in the rotation of the head 335, the driven clutch member 358 of this pair of spindles will be in axial alignment with the single driving clutch member 359 on the shaft 360, so that when the clutch members are brought into engagement, the spindles of this pair will be driven to wind cotton thereon.

Means are provided for moving the clutch member 359 into engagement with a clutch member 358 in alignment therewith. For this purpose, the clutch member 359 is suitably connected to the bifurcated rear end of a lever 361, so that counterclockwise movement of this lever about its pivot 362, as seen in Fig. 13, will result in the upward movement of the driving clutch member 359 into engagement with one of the clutch members 358. The lever 361 is pivoted at 362 to an extension of a bracket 363, which is of the peculiar form shown in Figs. 6 and 13 and is secured at its inner end to the forward end of the large diameter shaft 338 so as to be held stationary thereby. The forward end of the lever 361 is connected by a pivoted link 364 to the upper end of a slide 365, the lower end of which is provided with a vertical slot 366, Fig. 6, slidingly embracing a rectangular block 367 in which the drive shaft 323 is journaled. The slide 365 also has a portion spaced from its lower end passing through a suitable bore in a bracket 368 forming a part of the frame 315 and extending inwardly therefrom. The slide 367 carries a cam roller 369 bearing against the periphery of a cam 370 secured to the drive shaft 323. Also disposed on the slide 365 is a stop washer 371 between which and the lower end of the bracket 368 is a compression spring 372 arranged to keep the cam roller 369 in engagement with the periphery of the cam 370 and to move the clutch member 359 into engagement with clutch member 358 when the cam roller 369 rides on a small diameter portion of the cam 370. Thus as the cam 370 makes a single revolution for each mechanical cycle of the machine, the clutch members 359 and 358 will be brought into engagement to cause the rotation of the spindles once during each mechanical cycle of the machine.

Means are provided for driving the shaft 360 continuously to drive the spindles when the clutch members 359 and 358 are in engagement. For this purpose, the shaft 360 is journaled in two positions of the bracket 363 and carries intermediate its bearings a bevel gear 373. Meshing with the gear 373 is a beveled gear 374 mounted on a shaft 375 journaled in the large diameter shaft 338 eccentrically thereof but parallel to the axis of that shaft. At its rear end the shaft 375 carries a pinion 376, Figs. 13 and 16, meshing with and arranged to be driven by a relatively large gear 377 mounted on a short shaft carried by a bracket 378, which is secured to the upper portion of the frame member 316. Also mounted on the same shaft and arranged to rotate with the gear 377 is a relatively small sprocket wheel 379 driven through a sprocket chain 380 from a relatively large sprocket wheel 381 secured to the transverse shaft 323 of the unit. Thus the shaft 360 will be continuously driven at a relatively high speed from the drive shaft 323 whenever the cotton unit is in operation under control of the clutch associated therewith.

Means are provided for moving the rolls of cotton off the spindles 334 and into the depressions in the ribbon 52 at the time the spindles are respectively associated and aligned with such depressions. For this purpose each pair of spindles has associated therewith a pair of stripper collars 382, both of which are carried by a transverse plate 383, which in turn is secured to a radially slidable shaft 384 mounted for sliding movement in respective spokes 336 of the head 335. The movement of each shaft 384 and hence of the collar members 382 associated therewith on their spindles is limited by a transverse pin 385 secured to the shaft 384 and extending through a slot 386, Fig. 16, cut in the bearing portion of the spoke 336 in which the shaft 384 is mounted. Each of the collar members and associated parts is normally retained at its radially inward position by means of a tension spring 387 extending between a pin on the plate 383 and a suitable anchorage adjacent to the hub portion 337 of the head 335 and carried by a part of this head.

The collar members 382 do not have to be moved outwardly along their associated spindles except at the time it is desired to discharge rolls of cotton therefrom into the depressions of the ribbon 52. For this purpose the springs 387 retain these members at their inward positions except at the time they are to be used for moving the cotton from the spindles into the depressions of the ribbon. This occurs only at the position of the spindle unit numbered 6 in Fig. 6, that is the lowermost position.

When at this position the pin 385 associated with the spindles to be stripped is located beneath the forward end of a lever 388, Fig. 13, which is pivoted at 389 to a part of the frame 316 or a bracket extending therefrom and which has its rear end bifurcated at 390 to engage a transverse pin portion 391, Fig. 16, of a vertical slide 392 mounted in a suitable guideway 393 in the rear of the frame member 316 and parallel to the guideway 349 for the slide 348. At its lower end the slide 392 carries a cam roll 394 bearing on the periphery of a rotatable cam 395 carried by the transverse drive shaft 323. Extending between the upper end of the slide 392 and a suitable anchorage on the frame 316 is a tension spring 396 tending to move the slide 392 downwardly when this action is permitted by the configuration of the cam 395 and to retain the roll 394 against the cam.

The cam 395 is so shaped and positioned on the shaft 323 as to cause the downward movement of the forward end of the lever 388 once during each mechanical cycle of the machine, at the appropriate time to push rolls of cotton into the associated aligned depressions in the ribbon 52 and around the pins 308, which at this time are positioned within these depressions, the lever 388 cooperating with each of the pushoff means associated with each pair of spindles in succession.

As the head 335 moves in a counterclockwise direction, as seen in Fig. 6, and the spindles move from the position of the pair of spindles numbered 1 through the position of the pair numbered 2 to the position of the pair numbered 3, the last of which is the winding position for the spindles, there is provided means for applying to the spindles a material of an adhesive nature in sufficient quantity so that when the cotton or equivalent substance is brought into engagement with the whirling spindles, it will adhere thereto so that it may be wound thereon. For this purpose there is provided a plurality of spaced discs 397, Fig. 6, rotatably mounted on a shaft 398 carried by a bracket 399 from the main frame 316. The discs 397 are preferably impregnated with a suitable adhesive material, such for example as a wool fat. As the spindles move past the discs 397 they come into contact on each side thereof with one of the discs, rotating the discs and wiping off sufficient of the impregnating material thereof onto the spindles so that the cotton will adhere to the spindles when it is brought into engagement therewith at the winding point.

Means are provided for supplying cotton or other fibrous material in a sliver or loose rope form to the spindles to be wound thereon. For this purpose the cotton or other material is supplied as shown at 400 to a pair of curved guides 401 and 402 which are supported at their vertical portions in brackets 403 and 404 respectively and at their upper ends by the feeding units 405 and 406 respectively. Inasmuch as each of these units is similar to the other, being respectively right and left-hand arranged, but one will be described.

The unit 405 comprises a rectangular frame 407 having rib portions arranged to slide in and be adjusted in respect to transversely extending horizontal grooves 408 in a pair of arms 409 rigid with or formed as a part of the bracket 355. Suitable means (not shown) are provided for securing the frame 407 in an adjusted position in respect to the arms 409, this position being one in which the frame 407 is located at a predetermined distance from the path of the associated spindles 334.

Arranged in the frame 407 are a pair of feed rolls including an upper roll 410 journaled in the frame 407 on an axis fixed in respect thereto and a lower roll 411, the pivot shaft of which is arranged for vertical movement in a slot formed between bifurcated lower end portions 412 of the frame 407. Leaf springs 413 secured to a transverse shaft 414 fixed in extensions from the lower ends of the frame 407 serve to urge the opposite ends of the shaft of the lower roll 411 upwardly so as to retain this roll in engagement with the upper roll 410 or with the cotton disposed between it and the upper roll. The rolls 410 and 411 are provided with intermeshing gears 415 and 416 respectively which are secured thereto and are adapted to be constantly in mesh at all positions of the lower roll in respect to the upper roll.

Means are provided for driving the rolls 410 and 411 comprising a helical gear 417 secured to the shaft carrying the upper roll 410 and meshing with a complementary helical gear 418 which is splined to a transversely extending shaft 419 journaled in suitable bearings carried by the bracket 355. The gear 418 has a portion journaled within a bracket extension of the frame 407 so that when this frame and the units 405 or 406 are adjusted transversely of the machine, that is, to the right or left as seen in Fig. 13, the gear 418 will be moved therewith. Thus, the gears 417 and 418 are always in mesh independently of the lateral adjustment of the units 405 and 406.

The shaft 419 is provided on its rear end, at the right as seen in Fig. 13, with a ratchet wheel 420 with which is associated a spring pressed pawl 421 carried by a rotatable member 422 which is arranged for free rotation about the axis of the shaft 419. For oscillating the member 422 to cause intermittent rotative movement of the shaft 419, the member 422 has pivoted thereto eccentrically of the shaft 419 a link 423. This link is pivoted at its lower end to a crank pin on a rotatable member 424 carried by a shaft 425, which is journaled in a bracket extension of the frame 316, Fig. 16. Also carried by the shaft 425 is a sprocket wheel 426 arranged to be driven by a sprocket chain 427 from a suitable sprocket 428 on the drive shaft 323. The sprocket chain 427 also passes around an intermediate idler sprocket 429, which is adjustable in the usual manner for maintaining the proper tension on the chain 427.

Associated with each of the units 405 and 406 is a shield member 430 extending between the region between the rolls 410 and 411 toward the associated spindles 334 at the winding position, so as to guide the cotton from the rolls to the spindle.

Disposed between the spindles 334 at the winding position is a rigid forming member 431 depending from the central portion of the arms 409 of the bracket 355 and so arranged and shaped as to shape the exterior contour of the roll of cotton on each spindle as it is formed.

The arrangement is such that the rolls 410 and 411 will be indexed a predetermined distance during each machine cycle through the driving means described to feed a predetermined amount of cotton toward the associated spindles along the shields 430. This cotton will be taken up by the spindles due to the adhesive material thereon and will be wound on the spindles as they are being rapidly rotated at this time. Inasmuch as only a predetermined amount of cotton will be fed through the rolls, and as the spindles will be given a relatively rapid rotation for a time period beyond that at which the feed of cotton by the rolls 410 and 411 has stopped, a predetermined amount of cotton only will be wound onto each spindle and will be pulled by the rotation of the spindle from the balance thereof still pinched between the rolls 410 and 411. This roll of cotton thus formed will be shaped by the member 431 during the winding thereof so as to approximate the shape of the interior of the depression in which it is to be placed.

As the spindles are moved from the position of the pair of spindles numbered 3 through the positions 4 and 5 to position 6, Fig. 6, no further action takes place. At position 6, the rolls of cotton are pushed from the spindles onto the pins 308, which at this time are at their uppermost position extending through the perforations through the bottoms of the depressions in the ribbon 52. The cotton rolls are retained in the depressions by the adhesive previously applied thereto by the unit 49 once it has been pushed into the depressions by the collar members 382 actuated by the means previously described. After the cotton rolls have been placed in position, the slide 310 will be moved downwardly, drawing the pins 308 out of the perforations in the depressions and freeing the ribbon 52 for further movement along its path to bring an empty pair of depressions into alignment with the next pair of filled spindles, which are indexed to the filling position simultaneously with the movement of the ribbon 52 another step along its path.

*The cutout unit 51, Figs. 1, 2, 6 and 14*

The last operation to be performed in forming articles, whether those articles be merely shaped by the unit 43 or shaped and then other operations performed thereon as by the units 48, 49 and 50, is to cut out the shaped article from the remainder of the ribbon 52. This is effected by the use of cooperating cutting dies, including upper dies or punches 432 and lower dies 433. The upper dies are interchangeably carried by a plate 434, which in turn is carried by the lower head of an upper slide 435. Also carried by the plate 434 is the usual stripper plate 436, which is urged downwardly in a conventional manner by compression springs 437. The lower dies are interchangeably carried by an apertured plate 438 from the upper end of a lower slide 439. The upper and lower slides are arranged for vertical sliding movement in upper guides 440 and lower guides 441 respectively, both of which are formed in a main frame 442 of the cutout unit, this frame being secured as by bolts 443 to the rails 15 and 16.

Means are provided for actuating the upper and lower slides for cutting out formed articles from the strip 52. For this purpose, the upper and lower slides 435 and 439 are respectively provided with cam rolls 444 and 445. The cam roll 444 works in a closed cam track 446 of an upper cam plate 447; while the lower cam roll 445 engages the periphery of a lower cam 448, this cam having, however, a portion 449 bolted thereon providing a closed cam track portion 450 effective to hold the roll 445 positively during the stripping of the dies 432 from the material. The lower slide 439 has connected therewith tension springs 451 secured at their lower ends to brackets 452 carried by the frame 442 so as to retain the roller 445 against the periphery of the cam 448 and to move the lower slide downwardly when such action is permitted by the configuration and position of this cam.

Means are provided for rotating the cams 447 and 448. For this purpose these cams are mounted respectively on shafts 453 and 454 journaled in suitable bearings in the frame 442 and carrying at their rear ends sprockets 455 and 456 respectively. Trained around these sprockets is a sprocket chain 457, an intermediate portion of which passes around an idler sprocket 458 mounted on a shaft journaled in a bracket 459 secured to the rail 16. The sprocket chain 457 also passes around a driving sprocket 460 mounted for free rotation on the shaft 19 and arranged to be clutched thereto by a clutch similar to those previously described and controlled by a clutch lever 461 having a handle 462 at its forward end.

The lower dies 433 and the plate 438 are apertured as shown for free passages of the articles cut out of the ribbon 52. The upper portion of the slide 439 is also provided with an inclined recess for deflecting these articles through a chute 463 carried by the slide 439 into a stationary chute 464. The chute 464 is carried at its left-hand end, as seen in Fig. 14, by a bracket 465 from the stationary bar 219 and at its right-hand end by a bracket 466 from the tie rod 17. The articles may be collected in any suitable receptacle and used for any desired purpose.

Once the articles have been stamped out of the ribbon, the scrap portion thereof indicated at 467, Fig. 6, may be deflected to a desired receiving point by a suitable deflecting means 468 and then used for any desired purpose, such for example as being chopped up into small particles and used for the forming of other articles, possibly more ribbon, such as that supplied to the machine in the roll 33.

THE PROCESS

*Continuous process, Figs. 17 and 18*

The process of Figures 17 and 18 has largely been set forth heretofore in describing the complete machine of Figs. 1 to 16 by which this process is carried out. The various elements shown diagrammatically in Figs. 17 and 18 are designated by the same reference characters used for the corresponding parts in the previous figures.

Reviewing the operations of the device briefly, the ribbon 52 of plastic material is brought between the heating elements 105 and 115 and is heated thereby to a sufficient extent to render the central portion thereof plastic and moldable, while the side portions are prevented from relative movement by moving through cooled guides, as above described. These guides extend to a point along the machine beyond the forming unit 43. At the same time the material is prevented from longitudinal deformation or attenuation due to its being under tension between the units 41 and 44 by the relatively rigid lateral portions of the ribbon. The ribbon is advanced by a series of intermittent steps, a predetermined point in the ribbon being disposed between the heating units during several of these steps so as to provide adequate time for heating the material to the desired temperature at the relatively high speed at which the apparatus is normally operated. The commercial apparatus built according to Figs. 1 to 16 of this application has produced nasal inhalers by the process disclosed at the rate of 7,200 per hour, and may be operated faster if desired.

The next operation is to form the articles in the desired shape, which is effected by the cooperating dies 137 and 138, which when working thermoplastic material are cooled in order to rigidify the material in a time period which is preferably substantially coextensive with the shaping of the desired portion thereof. It is noted that not only is the portion immediately shaped cooled by the cooperating dies 137 and 138, but also a portion of the ribbon adjacent to the shaped portions is similarly cooled. The purpose is to cool substantially the entire area across the ribbon during the shaping thereof, so that from this point onward in the machine, the material of the ribbon may be considered as being in a rigid condition to the extent that that term may be applied to this type of material. It is further contemplated that should thermosetting material be used, the die members 137 and 138 may be suitably heated so as to rigidify this type of material concomitantly with the shaping thereof.

In making many articles by the process herein disclosed and claimed, all that now remains is to cut out the desired article from the ribbon. The particular machine herein disclosed, however, is adapted for the further purpose of providing holes in the bottom of the depressions and then filling the depressions with a filtering material, absorbent cotton, which is preferably stuck to the interior of the depressions to prevent the accidental dislodgment thereof.

For this purpose, the unit 48, Fig. 1, including the members 223 and 224, is provided for perforating the bottoms of the depressions. The depressions are then moved to the adhesive-applying unit 49, which supplies a predetermined amount of an adhesive material thereinto. The predetermined and glued depressions are then moved to a cotton applying unit, which supplies an annular roll of absorbent cotton into the interior of the depressions in the manner described.

I contemplate, however, that if desired, a means similar to the unit 49 might be used for filling imperforate depressions of a ribbon with a desired fluid material to be contained therein. Possible variations in the function of the unit 50, here used for filling rolls of cotton into the depressions in the ribbon have previously been described.

The last unit which is used, whether or not the depressions be perforated and filled, is the cutting out unit 51 including the dies 432 and 433, by which the formed article is cut out from the remainder of the ribbon. The ribbon scrap may be utilized in any desired manner and is preferably reworked in order that the process may be carried on economically.

The process disclosed in Figs. 17 and 18 is substantially the same as that disclosed in applicant's earlier and copending application, Serial No. 56,905 filed December 31, 1935, of which the present application constitutes a continuation in part.

*Intermittent or hand process, Figs. 19 to 25 inclusive*

The process of this invention may also be utilized while working with a single sheet of material which is held in a hand frame so as to hold the perimetrical portions of the sheet against relative movement while the center part is heated. This process is illustrated in Figs. 19 to 25 inclusive.

In these figures a sheet 469 of a desired organic plastic material, as above set forth, may be held in a frame, including a lower rectangular member 470 and an upper rectangular member 471, the frame engaging the perimetrical portions of the sheet. As shown, the frame member 470 is provided with a plurality of bolts 472 passing loosely through apertures in the frame member 471 and provided with nuts 473 thereon.

While so confined the sheet may be held over a suitable heating means, such as a block 474 of any desired material, such as aluminum, having therein an electric heating element 475. Alternatively any desired source of heat, preferably not including an open flame, may be used, it being preferred to heat the plastic material primarily by radiation. The center portion of the material is heated so that it is brought to a plastic and moldable condition. Some types of organic plastic material when heated to a desired working temperature are so soft that they will sag by their own weight, as indicated at 476, Fig. 22. This is often true when using material as thin as .010". At the same time undesired deformation of the material is prevented due to the fact that the surrounding edge portions are maintained relatively cool, by being held between the frame members 470 and 471 and are thereby prevented from relative movement to prevent undesired deformation of the heated central portion of the sheet.

The first operation subsequent to the heating is that shown by a comparison of Figs. 22, 23 and 24, which is the forming operation, comprising the bringing together of dies diagrammatically shown at 477 and 478. This is essentially the same as that hereinabove described for the unit 43. The dies should preferably be maintained at a temperature somewhat below the softening temperature of the material in the case of thermoplastic material. The higher the speed of operation, the colder the dies may be kept, it being desired to extract sufficient heat from the material during the actual shaping thereof that the material will be rigidified at the time the dies are moved apart and out of contact therewith, but not so far prior to this time but that the plastic material may be sufficiently soft to take the shape imparted to it without tearing or breaking and without creating such strains therein as might impair the appearance of the article as formed.

When making relatively deep articles in proportion to the diameter thereof and in proportion to the thickness of the material from which they are made, it is advantageous to use a closed female die, so that once the material has been brought into contact with the upper edges of this die, air will be trapped therebeneath in the hollow of the die which must be displaced prior to the completion of the forming operation. This air can only flow out between the die and the material; and thus serves effectively to prevent too rapid heat transfer between the die and the plastic material which might rigidify it before the completion of the forming operation. It has been found that by using a closed die of this kind, without vent holes or other venting means, that it is possible to make much deeper draws or deeper articles than can be made without resorting to this expedient. The process of forming deep articles in this manner is, therefore, one of the features of this invention.

The step of the process shown in Fig. 25 is merely the cutting out from the sheet 469 of the completed article shown at 479, leaving the remainder of the sheet to be salvaged in any desired manner.

*The process in a rotary machine, Figs. 26 to 31 inclusive*

In Figs. 26 to 31 inclusive is shown diagrammatically, a means for carrying out the process of Figs. 19 to 25 with a plurality of separate sheets and holders mounted on a rotatable table. As shown, each of the sheets 480 of organic plastic material is suitably held at its periphery between upper and lower clamping rings, shown at 481 and 482 respectively, suitable means (not shown) being provided, if desired and to the extent necessary, for holding these rings together in clamping the periphery of a sheet 480.

It is sometimes desirable that the perimetrical portions or held portions of a sheet be held sufficiently loosely so that the sheet may be drawn to some extent from between the gripping means during the forming of an article so as to feed material into the portion being formed. This drawing away from the holding means is limited, however, by the requirement that the parts of the sheet used actually in forming the article must first be preheated; and therefore no portion which is shielded from the heat by the holding means during the heating of the sheet should be counted upon to flow or be moved into the space between the dies during the forming of an article.

The process of Figs. 26 to 31 is substantially the same as that of Figs. 19 to 25 in that at position A, the sheet 480 and the holding rings are as shown in Fig. 27; that is, the sheet has not yet been heated and is held between the rings. It is contemplated that sheets might be placed on the machine at position A, to be carried through the process as hereinafter set forth. At position B, the sheet 480 is brought above a heating means, shown diagrammatically at 483, Fig. 28. At position C and in Fig. 29 the sheet 480 has been brought between a pair of cooperating dies 484 and 485, which form the heated central portion thereof to a desired shape. At position D and in Fig. 30 the desired article has been blanked out from the remainder of the sheet by cooperating cutting dies 486 and 487. At position E and in Fig. 31 the annular remainder of the sheet shown at 488 remains between the holding members 481 and 482 ready for removal from the machine, either with the holding members or for the substitution of a new sheet 480 between the holding members 481 and 482.

The subject matter of Figs. 19 to 31 inclusive is substantially the same as that forming the subject matter of applicant's earlier and copending application, Serial No. 143,113, filed May 17, 1937, of which the present application also forms a continuation in part.

*Alternative ways of holding a sheet, Figs. 32 to 37 inclusive*

In Figs. 32, 33 and 34, there is shown a sheet 489 arranged to be slit as shown along parallel lines at 490 just inside a holding frame, which may be the same as a frame shown in Figs. 19 to 25 and which for this reason is given the same reference numbers, the slits being disposed inside the frame, so that but two sides of the central portion of the sheet are positively held during the heating and forming thereof. When an article such as that shown at 491, Figs. 33 and 34, is formed by a pressing operation similar to that previously described, the material will draw away from the slits 490 about as shown in Fig. 33. This will result in a larger proportion of the material of the sheet being used in forming the article 491 and thus in a heavier walled article than would be made were the entire perimetry of the sheet held as indicated in Figs. 19 to 25. The article 491 shown in Figs. 33 and 34, after cutting out from the sheet, may be used as a cover for a tooth brush holder.

In Figs. 35, 36 and 37 is shown another manner of slitting in which the slits are formed starting at the corners of the sheet inside the frame, which may be the same as that previously described, and extending along each side one-quarter of the length of that side. Such slits are shown at 492. The result of the operation of forming the same article 491 is illustrated in Figs. 36 and 37, using this type of slitting. This produces in certain respects a more uniform distribution of the material in the article due to a larger number of slits being employed. It is contemplated that any desired number of slits may be employed in order that the material may feed to the article being formed so as to give desired weight and distribution characteristics to the final article.

The two methods of slitting illustrated in Figs. 32 to 37 are disclosed, but not illustrated, in applicant's copending application, Serial No. 143,113, of which the present application is a continuation in part, the result of the production of articles as shown at 491 being substantially

Conclusion

While there is particularly shown and described a machine for making nasal inhalers, it will be understood that many other types of articles, particularly containers and other articles which may be made from a sheet by the application of differential pressure, either mechanical or pneumatic, on opposite sides of the sheet are to be considered within the purview of this invention. It is further contemplated that while the process is particularly adaptable to the making of articles from thermoplastic material, it may also be used advantageously with certain types at least of the thermosetting organic materials, or in fact with any material which may be brought to a fluent and moldable condition by heat, while certain at least of the perimetrically arranged portions surrounding the softened portion are prevented from relative movement so as to prevent undesired deformation of the heated portion. It is desired, therefore, that all variants and embodiments of the invention be considered as within the purview thereof which fall within the scope of the appended claims, which are to be construed as broadly as the state of the prior art permits.

I claim:

1. The process of manufacturing an article from a sheet of organic plastic material, comprising heating a selected portion only of said sheet in a heating zone to a temperature sufficient to render said portion plastic and moldable, while holding integral, perimetrically-disposed, unheated portions of the sheet arranged about the heated portion to prevent undesired distortion of said heated portion, transferring the heated portion of the sheet to a forming zone, and there shaping said heated portion to the form of the desired article.

2. The process of manufacturing an article from a sheet of organic plastic material, comprising heating a selected portion only of said sheet in a heating zone to a temperature sufficient to render the material plastic and moldable, while holding integral unheated portions of the sheet arranged about the heated portion to prevent undesired distortion of the heated portion, transferring the heated portion of the sheet to a forming zone while it is so held, forming the heated portion of the sheet to the shape of the desired article by drawing it with dies while the material is still in a plastic and moldable condition, and maintaining the temperature of the dies such as to rigidify the material by heat transferred between the material and the dies.

3. The process of making a filter from a sheet of organic plastic material, comprising heating a selected portion only of said sheet in a heating zone to a temperature sufficient to render said portion plastic and moldable while holding integral unheated portions of the sheet arranged about the heated portion to prevent undesired distortion of the heated portion, transferring the heated portion of the sheet to a forming zone while it is so held, there shaping the heated portion of the sheet to a desired form for the shell portion of the filter including sides and a bottom, perforating the bottom of the shell thus formed, inserting a filler of absorbent material into the shell thus formed and perforated while it is still integral with said sheet, and thereafter severing the filled filter from the remainder of the sheet.

4. The process of making a filter from a strip of organic plastic material in sheet form, comprising successively heating central portions only of the strip while holding integral unheated portions of the strip arranged about the heated portions thereof to prevent undesired distortion of the heated portions, successively moving the strip to move the heated portions thereof to a forming zone while they are so held, successively shaping the heated portions of the strip in the forming zone to the desired forms of the shell portions of the filters to be formed including sides and bottoms while rigidifying the shaped portions of the strip prior to the movement thereof out of the forming zone, successively perforating the bottoms of portions of the strip shaped as aforesaid, successively applying adhesive to the interiors of the previously shaped and perforated portions of the strip, and successively applying tubular absorbent filters to the interiors of the shaped portions of the strip to which adhesive has previously been applied, certain at least of the operations of heating, shaping, perforating, applying adhesive and applying filters being carried out simultaneously on different portions of the strip.

5. The process of making articles from an elongate sheet of organic thermoplastic material, comprising heating a selected portion only of said sheet sufficiently so that the material heated becomes plastic and moldable while holding integral unheated portions of the sheet arranged about the heated portion to prevent undesired distortion of the heated portion, drawing another previously heated and similarly held portion of the sheet with cooler dies and thereby forming it to the shape of the desired article before the last mentioned portion has cooled sufficiently to become hard, and separating an article previously formed as aforesaid from another portion of said sheet.

6. The process of forming articles from a strip of organic plastic material which may be softened to a plastic and moldable condition by heating, which comprises the steps of passing the strip while continuously under longitudinal tension through a plurality of zones, heating the central portion only of the strip during its passage through the first of said zones to a plastic and moldable condition while retaining integral lateral portions of the strip unheated to prevent undesired elongation thereof under the tension, applying pressure to a selected part of the central portion of the strip in a second of said zones to form it to a desired shape while rigidifying the formed portion during the shaping thereof by controlling the temperature thereof in order that it may retain the shape thus imparted thereto.

7. The process of forming articles from a strip of organic plastic material which may be softened to a plastic and moldable condition by heat, which comprises the steps of passing the strip while continuously under longitudinal tension through a plurality of zones, heating the central portion only of the strip during its passage through a first of said zones to bring it to a plastic and moldable condition while retaining integral lateral portions of the strip unheated to prevent undesired elongation thereof, simultaneously preventing lateral deformation of the strip under the heat by guiding angularly disposed edge portions of the strip in parallel grooves at least along that portion of the path of the strip where the central portion thereof is heated and thereby rendered moldable, applying pressure to a selected part of the heated central portion of the strip in a second of said zones and thereby forming it to a desired shape while controlling the temperature of the portion thus formed during the shaping thereof so as to cause it to retain the shape thus imparted thereto, and separating selected shaped portions of the strip from the remainder thereof in a third of said zones.

8. The process of forming an article from a thermoplastic sheet, comprising the steps of heating a selected portion only of the sheet to a softening temperature at which deformation of the heated material would occur if not prevented, while preventing undesired deformation thereof by holding certain at least of the unheated portions of the sheet against relative movement, and forming the heated portion of the sheet to a desired shape while it is still soft while simultaneously extracting sufficient heat therefrom to cause the formed portion of the sheet to retain the shape thus imparted thereto.

9. The process of forming a series of articles from thermoplastic sheets, comprising heating selected portions of each sheet to a softening temperature at which deformation of the heated material would occur if not prevented, while preventing undesired deformation of the heated portions of the sheets by holding certain at least of the unheated portions of the sheets against relative movement, forming the heated portions of the sheets to the shapes of the desired articles while the sheets are still soft and while simultaneously extracting sufficient heat from the sheets to cause the formed portions thereof to retain the shapes imparted thereto, and so timing the above recited operations in the forming of a series of articles that the forming of an article from the heated portion of one sheet takes place in a time period overlapping at least in part the heating period for a succeeding sheet from which a succeeding article is to be formed.

10. The process of manufacturing an article from a sheet of organic plastic material, comprising maintaining the perimetrical portion of the sheet against relative movement, cutting a plurality of spaced slits around the area of the sheet from which an article is to be formed and within the held perimetrical portion thereof, heating said area of the sheet to bring the material thereof to a plastic and moldable condition, shaping an article to be formed from the heated portion of the sheet by differential pressure applied to the opposite faces thereof and thereby drawing portions of the sheet away from said slits to cause at least a portion of the material between the slits and the area immediately forming the article to flow or move away from the slits and into the body of the article as it is shaped, and rigidifying the article thus shaped in the shape thus imparted thereto.

11. The process according to claim 10 in which the slits formed are predetermined as to their length and location in respect to the size and shape of an article to be formed as compared with the area and shape of the heated portion of the sheet from which it is to be formed.

12. The process according to claim 10 in which two slits are formed substantially parallel to one another and on opposite sides of the area of the sheet from which the article is to be formed.

13. The process according to claim 10 wherein the perimeter of the sheet held against relative movement is substantially rectangular and wherein slits are formed at the corners extending predetermined distances from the corners along each side.

14. The process of making articles from sheets of organic thermoplastic material by deep pressing operations, comprising heating a selected portion only of a sheet of such material to bring it to a plastic and moldable condition while preventing undesired distortion of the heated portion of the sheet by holding integral unheated portions of the sheet about the heated portion against relative movement, drawing the heated portion of the sheet to a desired form between relatively cool male and female dies while extracting heat from the material by the dies during the forming thereof so that when forming is completed, the material will retain the shape imparted thereto, and preventing too rapid chilling and consequent rigidification of the material during the forming thereof as aforesaid by trapping air between the material being formed and the female die to prevent the material from coming into good heat transferring relation with the female die prior to the completion of the shaping operation.

15. The process of forming an article from a thermoplastic sheet, comprising the steps of heating a selected portion only of the sheet to a softening temperature at which deformation of the heated material would occur if not prevented, while preventing undesired deformation thereof by holding certain at least of the unheated portions of the sheet against relative movement, forming the heated portion of the sheet to a desired shape by cooperating dies, and controlling the temperatures of the dies in accordance with the speed of operation thereof and the temperature and heat content of the plastic material used so as to cause the shaping of the material and the extraction of sufficient heat therefrom by the dies to render the material self-sustaining in the shape imparted thereto to be substantially coextensive in time.

16. The process of manufacturing an article from a sheet of organic plastic material, comprising heating a selected portion only of said sheet to a softening temperature at which deformation of the heated material might occur if not prevented, while preventing undesired deformation thereof by holding certain at least of the unheated portions of the sheet against relative movement, forming the heated portion of the sheet to a desired shape while it is still soft and by the application of differential pressure to the opposite faces thereof, and cooling the held portions of the sheet at least during the exposure of the central portion thereof to heat so as to retain the cooled portions of the sheet relatively rigid to serve as a means by which the sheet may be held to prevent undesired deformation of the heated portion thereof.

17. The process of forming articles from a strip of organic plastic material which may be softened to a plastic and moldable condition by heat, comprising bending lateral edge portions of the strip along parallel longitudinal fold lines to form flanges lying in planes at substantial angles to the plane of the main body of the strip, passing the strip under longitudinal tension adjacent to a source of heat while passing the flange portions thereof formed as aforesaid through parallel grooves shielded from said source of heat and thereby preventing undesired deformation of the heated portion of the strip, and forming a series of articles from the heated central portion of the strip at a position adjacent to but spaced from said source of heat and before the material of the heated portion of the strip has cooled sufficiently to become rigid.

18. The process according to claim 17 including the further step of positively cooling the flange portions of the strip at least during the passage of such portions adjacent to said source of heat.

19. Apparatus for making articles from organic thermoplastic material, comprising means for engaging selected perimetrically arranged portions of a sheet of such material, means for positively cooling said engaging means, means for heating a central portion only of the sheet to bring it to a plastic and moldable condition while the sheet is engaged by said first named cooled means, means for moving the heated portion of the sheet away from said heating means and to a forming zone constructed and arranged to prevent relative movement of said perimetrically arranged portions thereof to prevent undesired distortion of the heated portion of the sheet, and means for shaping the heated portion of the sheet to a desired shape in said forming zone.

20. Apparatus according to claim 19, and wherein said means for shaping comprises cooperating dies and means for cooling the dies.

21. Apparatus for making filters having shell portions of organic plastic material, comprising means for engaging selected perimetrically arranged portions of a sheet of such material, means for heating the central portion only of such sheet to bring it to a plastic and moldable condition, automatic means for moving the heated portion of the sheet away from said heating means and to a forming zone while preventing relative movement of said perimetrically arranged portions of the sheet to prevent undesired distortion of the heated portion thereof, automatic means operating at a predetermined time after the heating of the sheet as aforesaid for shaping the heated portion of the sheet to a desired shape in said forming zone while retaining the shaped portion of the sheet integral with the remainder thereof and while rigidifying the material of the heated portion of the sheet to cause the article thus formed to retain the shape imparted to it, automatic means operating in timed relation to the shaping of the sheet for perforating the shaped article at a zone spaced from the forming zone, automatic means operating in timed relation to the perforating of an article as aforesaid for inserting into the interior of the shaped and perforated portion of the sheet a filling of filtering material at a filling zone spaced from the previously named zones, and automatic means operating in timed relation to the operation of the shaping, perforating and filling means aforesaid for severing the shaped and filled article from the remainder of the sheet.

22. Apparatus for forming articles from a strip of organic plastic material, comprising means for moving the strip along a predetermined path and for maintaining it under longitudinal tension during its movement through a certain portion at least of said path, means engaging the lateral edges of said strip to prevent relative movement thereof during the movement of said strip through a predetermined portion at least of said path, means for heating the central portion of the strip to bring the material thereof to a plastic and moldable condition during the movement of the strip through a part of the path along which the lateral portions thereof are engaged as aforesaid, and means located adjacent to a portion of the path spaced from but adjacent to the strip-heating portion thereof for shaping the central portion of the strip to form the desired articles therefrom, the aforesaid means being so constructed and arranged that undesired deformation of the heated central portion of the strip, which might otherwise occur, is prevented by the aforesaid means for tensioning it and the means for preventing relative movement of the lateral portions thereof.

23. Apparatus according to claim 22, wherein the strip moving means operate intermittently, and wherein said shaping means comprises cooperating dies, and means for operating said dies to move them toward and from a position engaging said strip.

24. Apparatus in accordance with claim 22, wherein said heating means comprises a source of heat spaced from the path of said strip, and means for adjustably controlling the distance between the path of said strip and said source of heat.

25. Apparatus in accordance with claim 22, wherein said heating means comprises two sources of heat spaced respectively from the path of said strip and disposed on opposite sides thereof, and means for independently adjusting the position of each of said sources of heat toward and from the path of said strip.

26. Apparatus in accordance with claim 22, wherein said heating means comprises a source of heat spaced from the path of said strip, and means for mounting said source of heat for movement to and from an operative position in respect to the path of said strip, the last named means being so constructed and arranged that in the event it is desired to stop the movement of said strip along its path, said source of heat may be moved to its inoperative position to prevent the heating of the strip thereby.

27. Apparatus in accordance with claim 22, wherein said shaping means comprises cooperating dies, and means for controlling the temperatures of said dies so as to control the temperature of the shaped portion of the strip during the shaping thereof.

28. Apparatus for forming articles from a strip of organic plastic material, comprising means for moving the strip along a predetermined path and for maintaining it under longitudinal tension during its movement through a certain portion at least of said path, means to bend the lateral edge portions of said strip at predetermined angles to the plane of the central portion thereof along parallel longitudinal fold lines to form flanges thereon, guide channels through which said flanges are led to prevent relative movement of the lateral portions of said strip, means opposite a portion at least of said guide channels for heating the central portion of said strip to bring the material thereof to a plastic and moldable condition, and means located adjacent to another portion of said guide channels and longitudinally spaced from said heating means for shaping the central portion of the strip to form the desired articles therefrom, whereby undesired deformation of the heated portion of said strip, which might otherwise occur, is prevented by passing said flanges through said guide channels in conjunction with said tensioning means.

29. Apparatus in accordance with claim 28, wherein cooling means are provided for positively cooling said guide channels to maintain the flanges of said strip and adjacent portions of the lateral edges thereof cool so as to prevent such portions of the strip being heated to an extent such that they will lose their normal rigidity.

30. Apparatus in accordance with claim 28 for forming articles from a strip of thermoplastic material, wherein the means for bending the lateral edge portions of the strip to form flanges thereon comprise heating means for softening the strip sufficiently to permit the forming of permanent folds therein, and cooperating rolls engaging the opposite faces of said strip, one of said rolls having flanges thereon extending over the ends of the other of said rolls.

31. Apparatus for applying predetermined amounts of a fluid to the interiors of a longitudinal series of equally spaced depressions formed in a continuous strip of material, comprising means for guiding said strip in a predetermined path, means for moving said strip along its path to bring the depressions therein successively to a predetermined point in said path at predetermined time intervals, a container for the fluid to be supplied to the interiors of said depressions, a nozzle associated with said container through which fluid is discharged therefrom, means for moving said nozzle successively into cooperative relation with each of said depressions while they are respectively at said predetermined point, and pump means associated with said container and actuated in synchronism with said nozzle moving means for introducing a predetermined amount of said fluid through said nozzle into the associated depression while it is in cooperative relation therewith.

32. Apparatus for applying predetermined amounts of a fluid to the interiors of a longitudinal series of equally spaced depressions formed in a continuous strip of material, comprising means for guiding the strip in a predetermined path, means for moving the strip along its path to bring the depressions therein successively to a predetermined point in said path at predetermined times, a slide movable toward and away from the path of said strip adjacent to said point, means for moving said slide toward and away from the path of said strip, a container for the fluid to be supplied to the interiors of said depressions mounted on said slide and for movement in respect thereto in a direction parallel to the direction of movement of said slide, a combined nozzle and pump chamber mounted on said container and arranged to be brought by the movement thereof successively into cooperative relation with each of said depressions, means for resiliently urging said container toward the end of said slide nearer the path of said strip, a plunger for cooperation with said pump chamber carried by said slide, and abutments arranged to stop the movement of said container and the nozzle associated therewith at a predetermined position in respect to the path of said strip while said plunger continues its movement in respect to said container to force the fluid from said nozzle into the interiors of said depressions.

33. Apparatus for filling wound rolls of fibrous material into the interiors of a longitudinal series of equally spaced depressions formed in a continuous strip of material, comprising means for guiding said strip in a predetermined path, means for moving said strip along its path to bring the depressions therein successively to a filling point in said path at predetermined times, a rotatable spindle mounted adjacent to said path and arranged at least at times to be located in axial alignment with a depression in said strip located at said filling point, means to supply fibrous material as a sliver or loose rope to said spindle, means to rotate the spindle about its axis to wind a roll of the fibrous material thereon, and means for discharging such roll from the spindle into a depression in said strip axially aligned therewith at the filling point.

34. Apparatus according to claim 33, wherein there are a plurality of similar spindles provided, a head on which all said spindles are mounted, means for indexing said head to bring said spindles successively to a position axially aligned with said filling point to which the depressions of said strip are successively brought, and wherein the means for supplying fibrous material to the spindles is located at a point spaced from the point at which the rolls of material are discharged from the spindles into the depressions of said strip.

35. Apparatus in accordance with claim 33, wherein the depressions of the strip are perforated, comprising in addition means for engaging the convex side of the depressions of the strip surrounding and centering each of said depressions at the filling point, the last named means having a pin therein constructed and arranged to pass through the perforations of each of said depressions to center the roll of fibrous material as it is supplied to the interior thereof.

36. Apparatus in accordance with claim 33, comprising in addition means to supply sufficient of an adhesive material to said spindle so that the fibrous material will adhere temporarily thereto so as to facilitate the forming of a roll of fibrous material on the spindle, and means associated with said spindle during the forming of a roll of fibrous material thereon for shaping the exterior contour of the roll thus formed to cause it substantially to conform to and fill the depression of said strip in which it is to be inserted.

37. Apparatus for filling wound rolls of fibrous material into the interiors of a longitudinal series of equally spaced depressions formed in a continuous strip of material, comprising means for guiding said strip in a predetermined path, means for moving said strip along its path to bring the depressions therein successively to a filling point in said path at predetermined times, a head mounted for rotation about an axis spaced from and extending transversely of the path of said strip, a plurality of radially disposed spindles mounted in said head for rotation in respect thereto, means for indexing said head to bring said spindles successively to a plurality of positions, one of which is in axial alignment with and adjacent to the filling point of said depressions, means for applying an adhesive material to said spindles while they are empty and moving away from said filling point in the rotation of said head, means at a subsequent dwell or winding position of said spindles in the rotation of said head for supplying a fibrous material to said spindles as a sliver or loose rope, means for rotating said spindles at such position to wind up a predetermined amount of the fibrous material thereon, means located adjacent to the winding position of said spindles for shaping the exterior contour of the roll of fibrous material being wound thereon, a collar associated with each spindle concentrically thereof and arranged for movement axially of the spindle, means for successively moving said collars to move the rolls of fibrous materials from the associated spindles when the spindles are respectively in alignment with the filling position for the depressions of said strip to supply the rolls of fibrous material to the depressions of the strip, and means arranged to engage each of said depressions at the filling point for centering it and for centering the roll of fibrous material as it is supplied thereto.

CLAUSS BURKART STRAUCH.